United States Patent
Zemla et al.

(10) Patent No.: US 11,905,823 B2
(45) Date of Patent: Feb. 20, 2024

(54) SYSTEMS AND METHODS FOR MARKER INCLUSION IN A WELLBORE

(71) Applicant: DynaEnergetics Europe GmbH, Troisdorf (DE)

(72) Inventors: Andreas Robert Zemla, Much (DE); Thilo Scharf, Donegal (IE); Liam McNelis, Bonn (DE); Christian Eitschberger, Munich (DE); Shmuel Silverman, Novato, CA (US)

(73) Assignee: DynaEnergetics Europe GmbH, Troisdorf (DE)

( * ) Notice: Subject to any disclaimer, the term of this patent is extended or adjusted under 35 U.S.C. 154(b) by 608 days.

(21) Appl. No.: 17/059,756

(22) PCT Filed: Mar. 18, 2019

(86) PCT No.: PCT/IB2019/000537
§ 371 (c)(1),
(2) Date: Nov. 30, 2020

(87) PCT Pub. No.: WO2019/229521
PCT Pub. Date: Dec. 5, 2019

(65) Prior Publication Data
US 2021/0199002 A1    Jul. 1, 2021

Related U.S. Application Data

(60) Provisional application No. 62/678,636, filed on May 31, 2018.

(51) Int. Cl.
E21B 47/09 (2012.01)
E21B 43/116 (2006.01)
H04Q 9/00 (2006.01)

(52) U.S. Cl.
CPC ............ *E21B 47/09* (2013.01); *E21B 43/116* (2013.01); *H04Q 9/00* (2013.01)

(58) Field of Classification Search
CPC .................................. E21B 47/09; H04Q 9/00
See application file for complete search history.

(56) References Cited

U.S. PATENT DOCUMENTS 2,216,359 A   10/1940  Spencer
2,358,466 A    9/1944  Miller
(Continued)

FOREIGN PATENT DOCUMENTS

CA      2821506 A1    1/2015
CN      85107897 A    9/1986
(Continued)

OTHER PUBLICATIONS

International Searching Authority; International Preliminary Report on Patentability of the International Searching Authority for PCT/EP2020/065180; dated Dec. 21, 2021; 7 pages.
(Continued)

*Primary Examiner* — Theodore N Yao
(74) *Attorney, Agent, or Firm* — Womble Bond Dickinson (US) LLP

(57) ABSTRACT

A system and a method for determining a location of an untethered drone in a wellbore are described herein. The system includes one or more markers to be placed within a wellbore casing where each of the one or more markers is configured to transmit a continuous or periodic signal. The system further includes a first sensor to be transported by the untethered drone where the first sensor is configured to sense an existence of the one or more markers.

16 Claims, 14 Drawing Sheets

(56) References Cited

U.S. PATENT DOCUMENTS

| | | |
|---|---|---|
| 2,418,486 A | 4/1947 | Smylie |
| 2,519,116 A | 8/1950 | Crake |
| 2,550,004 A | 4/1951 | Doll |
| 2,621,744 A | 12/1952 | Toelke |
| 2,696,258 A | 12/1954 | Greene |
| 2,755,863 A | 7/1956 | Stansbury et al. |
| 2,873,675 A | 2/1959 | Lebourg |
| 2,889,775 A | 6/1959 | Owen |
| 3,155,164 A | 11/1964 | Keener |
| 3,170,400 A | 2/1965 | Nelson |
| 3,213,414 A | 10/1965 | Moser |
| 3,233,674 A | 2/1966 | Kurt |
| 3,246,707 A | 4/1966 | Bell |
| 3,374,735 A | 3/1968 | Moore |
| 3,504,723 A | 4/1970 | Cushman et al. |
| 3,713,334 A | 1/1973 | Vann et al. |
| 3,859,921 A | 1/1975 | Stephenson |
| 4,007,790 A | 2/1977 | Henning |
| 4,007,796 A | 2/1977 | Boop |
| 4,058,061 A | 11/1977 | Mansur, Jr. et al. |
| 4,140,188 A | 2/1979 | Vann |
| 4,182,216 A | 1/1980 | DeCaro |
| 4,266,613 A | 5/1981 | Boop |
| 4,290,486 A | 9/1981 | Regalbuto |
| 4,491,185 A | 1/1985 | McClure |
| 4,496,008 A | 1/1985 | Pottier et al. |
| 4,523,650 A | 6/1985 | Sehnert et al. |
| 4,574,892 A | 3/1986 | Grigar et al. |
| 4,598,775 A | 7/1986 | Vann et al. |
| 4,619,320 A | 10/1986 | Adnyana et al. |
| 4,621,396 A | 11/1986 | Walker et al. |
| 4,657,089 A | 4/1987 | Stout |
| 4,747,201 A | 5/1988 | Donovan et al. |
| 4,753,170 A | 6/1988 | Regalbuto et al. |
| 4,757,479 A | 7/1988 | Masson et al. |
| 4,776,393 A | 10/1988 | Forehand et al. |
| 4,790,383 A | 12/1988 | Savage et al. |
| 4,800,815 A | 1/1989 | Appledorn et al. |
| 4,808,925 A | 2/1989 | Baird |
| 4,884,506 A | 12/1989 | Guerreri |
| 4,889,183 A | 12/1989 | Sommers et al. |
| 5,027,708 A | 7/1991 | Gonzalez et al. |
| 5,052,489 A | 10/1991 | Carisella et al. |
| 5,060,573 A | 10/1991 | Montgomery et al. |
| 5,088,413 A | 2/1992 | Huber |
| 5,105,742 A | 4/1992 | Sumner |
| 5,115,196 A | 5/1992 | Low et al. |
| 5,159,145 A | 10/1992 | Carisella et al. |
| 5,322,019 A | 6/1994 | Hyland |
| 5,392,860 A | 2/1995 | Ross |
| 5,436,791 A | 7/1995 | Turano et al. |
| 5,603,384 A | 2/1997 | Bethel et al. |
| 5,703,319 A | 12/1997 | Fritz et al. |
| 5,775,426 A | 7/1998 | Snider et al. |
| 5,816,343 A | 10/1998 | Markel et al. |
| 5,992,289 A | 11/1999 | George et al. |
| 6,006,833 A | 12/1999 | Burleson et al. |
| 6,012,525 A | 1/2000 | Burleson et al. |
| 6,044,905 A | 4/2000 | Harrison, III |
| 6,056,058 A | 5/2000 | Gonzalez |
| 6,070,662 A | 6/2000 | Ciglenec et al. |
| 6,112,666 A | 9/2000 | Murray et al. |
| 6,164,375 A | 12/2000 | Carisella |
| 6,173,606 B1 | 1/2001 | Mosley |
| 6,269,875 B1 | 8/2001 | Harrison, III et al. |
| 6,298,915 B1 | 10/2001 | George |
| 6,305,287 B1 | 10/2001 | Capers et al. |
| 6,333,699 B1 | 12/2001 | Zierolf |
| 6,354,374 B1 | 3/2002 | Edwards et al. |
| 6,412,573 B2 | 7/2002 | Vaynshteyn |
| 6,414,905 B1 | 7/2002 | Owens et al. |
| 6,418,853 B1 | 7/2002 | Duguet et al. |
| 6,464,011 B2 | 10/2002 | Tubel |
| 6,467,387 B1 | 10/2002 | Espinosa et al. |
| 6,584,406 B1 | 6/2003 | Harmon et al. |
| 6,588,267 B1 | 7/2003 | Bradley |
| 6,597,175 B1 * | 7/2003 | Brisco .................... E21B 33/16 324/326 |
| 6,651,747 B2 | 11/2003 | Chen et al. |
| 6,739,265 B1 | 5/2004 | Badger et al. |
| 6,742,602 B2 | 6/2004 | Trotechaud |
| 6,752,083 B1 | 6/2004 | Lerche et al. |
| 6,763,883 B2 | 7/2004 | Green et al. |
| 6,779,605 B2 | 8/2004 | Jackson |
| 6,820,693 B2 | 11/2004 | Hales et al. |
| 6,843,317 B2 | 1/2005 | Mackenzie |
| 6,851,476 B2 | 2/2005 | Gray et al. |
| 6,966,262 B2 | 11/2005 | Jennings, III |
| 6,988,449 B2 | 1/2006 | Teowee et al. |
| 7,073,580 B2 | 7/2006 | Wilson et al. |
| 7,082,877 B2 | 8/2006 | Jennings, III |
| 7,147,068 B2 | 12/2006 | Vail, III |
| 7,193,527 B2 | 3/2007 | Hall |
| 7,217,917 B1 | 5/2007 | Tumlin et al. |
| 7,322,416 B2 | 1/2008 | Burris, II et al. |
| 7,331,394 B2 | 2/2008 | Edwards et al. |
| 7,363,967 B2 | 4/2008 | Burris et al. |
| 7,387,162 B2 | 6/2008 | Mooney, Jr. et al. |
| 7,510,017 B2 | 3/2009 | Howell et al. |
| 7,568,429 B2 | 8/2009 | Hummel et al. |
| 7,617,775 B2 | 11/2009 | Teowee |
| 7,681,500 B2 | 3/2010 | Teowee |
| 7,762,172 B2 | 7/2010 | Li et al. |
| 7,778,006 B2 | 8/2010 | Stewart et al. |
| 7,810,430 B2 | 10/2010 | Chan et al. |
| 7,870,825 B2 | 1/2011 | Teowee |
| 7,908,970 B1 | 3/2011 | Jakaboski et al. |
| 7,913,603 B2 | 3/2011 | LaGrange et al. |
| 7,929,270 B2 | 4/2011 | Hummel et al. |
| 7,980,309 B2 | 7/2011 | Crawford |
| 8,066,083 B2 | 11/2011 | Hales et al. |
| 8,069,789 B2 | 12/2011 | Hummel et al. |
| 8,074,713 B2 | 12/2011 | Ramos et al. |
| 8,091,477 B2 | 1/2012 | Brooks et al. |
| 8,157,022 B2 | 4/2012 | Bertoja et al. |
| 8,165,714 B2 | 4/2012 | Mier et al. |
| 8,181,718 B2 | 5/2012 | Burleson et al. |
| 8,182,212 B2 | 5/2012 | Parcell |
| 8,186,259 B2 | 5/2012 | Burleson et al. |
| 8,256,337 B2 | 9/2012 | Hill |
| 8,336,437 B2 | 12/2012 | Barlow et al. |
| 8,360,161 B2 | 1/2013 | Buytaert et al. |
| 8,395,878 B2 | 3/2013 | Stewart et al. |
| 8,451,137 B2 | 5/2013 | Bonavides et al. |
| 8,505,632 B2 | 8/2013 | Guerrero et al. |
| 8,576,090 B2 | 11/2013 | Lerche et al. |
| 8,646,520 B2 | 2/2014 | Chen |
| 8,661,978 B2 | 3/2014 | Backhus et al. |
| 8,695,506 B2 | 4/2014 | Lanclos |
| 8,810,247 B2 | 8/2014 | Kuckes |
| 8,863,665 B2 | 10/2014 | DeVries et al. |
| 8,875,787 B2 | 11/2014 | Tassaroli |
| 8,881,816 B2 | 11/2014 | Glenn et al. |
| 8,884,778 B2 | 11/2014 | Lerche et al. |
| 8,899,322 B2 | 12/2014 | Cresswell et al. |
| 8,950,480 B1 | 2/2015 | Strickland |
| 8,981,957 B2 | 3/2015 | Gano et al. |
| 9,062,539 B2 | 6/2015 | Schmidt et al. |
| 9,080,433 B2 | 7/2015 | Lanclos et al. |
| 9,181,790 B2 | 11/2015 | Mace et al. |
| 9,194,219 B1 | 11/2015 | Hardesty et al. |
| 9,284,819 B2 | 3/2016 | Tolman et al. |
| 9,317,038 B2 | 4/2016 | Ozick et al. |
| 9,328,577 B2 | 5/2016 | Hallundbaek et al. |
| 9,359,884 B2 | 6/2016 | Hallundbaek et al. |
| 9,441,470 B2 | 9/2016 | Guerrero et al. |
| 9,464,508 B2 | 10/2016 | Lerche et al. |
| 9,476,289 B2 | 10/2016 | Wells |
| 9,494,021 B2 | 11/2016 | Parks et al. |
| 9,518,454 B2 | 12/2016 | Current et al. |
| 9,556,725 B2 | 1/2017 | Fripp et al. |
| 9,581,422 B2 | 2/2017 | Preiss et al. |
| 9,593,548 B2 | 3/2017 | Hill et al. |
| 9,598,942 B2 | 3/2017 | Wells et al. |

(56) References Cited

U.S. PATENT DOCUMENTS

| | | |
|---|---|---|
| 9,605,937 B2 | 3/2017 | Eitschberger et al. |
| 9,617,814 B2 | 4/2017 | Seals et al. |
| 9,617,829 B2 | 4/2017 | Dale et al. |
| 9,677,363 B2 | 6/2017 | Schacherer et al. |
| 9,726,005 B2 | 8/2017 | Hallundbaek et al. |
| 9,784,549 B2 | 10/2017 | Eitschberger |
| 9,797,238 B2 | 10/2017 | Frosell et al. |
| 9,835,428 B2 | 12/2017 | Mace et al. |
| 9,896,920 B2 | 2/2018 | Holder |
| 9,903,192 B2 | 2/2018 | Entchev et al. |
| 9,963,955 B2 | 5/2018 | Tolman et al. |
| 10,001,007 B2 | 6/2018 | Pelletier et al. |
| 10,053,968 B2 | 8/2018 | Tolman et al. |
| 10,066,921 B2 | 9/2018 | Eitschberger |
| 10,077,641 B2 | 9/2018 | Rogman et al. |
| 10,100,612 B2 | 10/2018 | Lisowski et al. |
| 10,138,713 B2 | 11/2018 | Tolman et al. |
| 10,151,180 B2 | 12/2018 | Robey et al. |
| 10,167,534 B2 | 1/2019 | Fripp et al. |
| 10,190,398 B2 | 1/2019 | Goodman et al. |
| 10,287,873 B2 | 5/2019 | Filas et al. |
| 10,301,910 B2 | 5/2019 | Whitsitt et al. |
| 10,352,144 B2 | 7/2019 | Entchev et al. |
| 10,458,213 B1 | 10/2019 | Eitschberger et al. |
| 10,584,552 B2 | 3/2020 | Cannon et al. |
| 10,598,002 B2 | 3/2020 | Sites |
| 10,605,037 B2 | 3/2020 | Eitschberger et al. |
| 10,689,955 B1 | 6/2020 | Mauldin et al. |
| 10,844,684 B2 | 11/2020 | Eitschberger |
| 10,927,650 B2 | 2/2021 | Schultz et al. |
| 11,047,189 B2 | 6/2021 | Fernandes et al. |
| 11,149,515 B1 | 10/2021 | Bull et al. |
| 2002/0020320 A1 | 2/2002 | Lebaudy et al. |
| 2002/0040783 A1 | 4/2002 | Zimmerman et al. |
| 2002/0050930 A1* | 5/2002 | Thomeer ................ G01V 15/00 340/853.3 |
| 2002/0062991 A1 | 5/2002 | Farrant et al. |
| 2002/0145423 A1 | 10/2002 | Yoo |
| 2003/0000411 A1 | 1/2003 | Cernocky et al. |
| 2003/0001753 A1 | 1/2003 | Cernocky et al. |
| 2004/0094305 A1 | 5/2004 | Skjærseth et al. |
| 2004/0216632 A1 | 11/2004 | Finsterwald |
| 2004/0239521 A1 | 12/2004 | Zierolf |
| 2005/0011645 A1 | 1/2005 | Aronstam et al. |
| 2005/0167101 A1 | 8/2005 | Sugiyama |
| 2005/0178282 A1 | 8/2005 | Brooks et al. |
| 2005/0194146 A1 | 9/2005 | Barker et al. |
| 2005/0217844 A1 | 10/2005 | Edwards et al. |
| 2005/0229805 A1 | 10/2005 | Myers, Jr. et al. |
| 2005/0241824 A1 | 11/2005 | Burris et al. |
| 2005/0241825 A1 | 11/2005 | Burris et al. |
| 2005/0241835 A1 | 11/2005 | Burris et al. |
| 2005/0269083 A1 | 12/2005 | Burris, II et al. |
| 2007/0084336 A1 | 4/2007 | Neves |
| 2007/0125540 A1 | 6/2007 | Gerez et al. |
| 2008/0047456 A1 | 2/2008 | Li et al. |
| 2008/0110612 A1 | 5/2008 | Prinz et al. |
| 2008/0134922 A1 | 6/2008 | Grattan et al. |
| 2008/0149338 A1 | 6/2008 | Goodman et al. |
| 2008/0173204 A1 | 7/2008 | Anderson et al. |
| 2008/0264639 A1 | 10/2008 | Parrott et al. |
| 2008/0307875 A1 | 12/2008 | Hassan et al. |
| 2009/0050322 A1 | 2/2009 | Hill et al. |
| 2009/0120637 A1* | 5/2009 | Kirkwood ................ E21B 47/00 166/250.01 |
| 2009/0301723 A1 | 12/2009 | Gray |
| 2009/0308589 A1 | 12/2009 | Bruins et al. |
| 2010/0000789 A1 | 1/2010 | Barton et al. |
| 2010/0089643 A1 | 4/2010 | Vidal |
| 2010/0163224 A1 | 7/2010 | Strickland |
| 2010/0206064 A1 | 8/2010 | Estes |
| 2010/0230104 A1 | 9/2010 | Nölke et al. |
| 2011/0024116 A1 | 2/2011 | McCann et al. |
| 2012/0085538 A1 | 4/2012 | Guerrero et al. |
| 2012/0199031 A1 | 8/2012 | Lanclos |
| 2012/0199352 A1 | 8/2012 | Lanclos et al. |
| 2012/0226443 A1 | 9/2012 | Cresswell et al. |
| 2012/0241169 A1 | 9/2012 | Hales et al. |
| 2012/0242135 A1 | 9/2012 | Thomson et al. |
| 2012/0247769 A1 | 10/2012 | Schacherer et al. |
| 2012/0247771 A1 | 10/2012 | Black et al. |
| 2012/0298361 A1 | 11/2012 | Sampson |
| 2013/0062055 A1 | 3/2013 | Tolman et al. |
| 2013/0112396 A1 | 5/2013 | Splittstoeßer |
| 2013/0118342 A1 | 5/2013 | Tassaroli |
| 2013/0199843 A1 | 8/2013 | Ross |
| 2013/0248174 A1 | 9/2013 | Dale et al. |
| 2014/0000877 A1 | 1/2014 | Robertson et al. |
| 2014/0076542 A1 | 3/2014 | Whitsitt et al. |
| 2014/0131035 A1 | 5/2014 | Entchev et al. |
| 2014/0218207 A1 | 8/2014 | Gano et al. |
| 2015/0176386 A1 | 6/2015 | Castillo et al. |
| 2015/0308208 A1 | 10/2015 | Capps et al. |
| 2015/0330192 A1 | 11/2015 | Rogman et al. |
| 2015/0337648 A1 | 11/2015 | Zippel et al. |
| 2016/0003025 A1 | 1/2016 | Beekman et al. |
| 2016/0032711 A1 | 2/2016 | Sheiretov et al. |
| 2016/0032712 A1* | 2/2016 | Frosell ................ G01V 3/26 324/346 |
| 2016/0040520 A1 | 2/2016 | Tolman et al. |
| 2016/0061572 A1 | 3/2016 | Eitschberger et al. |
| 2016/0069163 A1 | 3/2016 | Tolman et al. |
| 2016/0084075 A1* | 3/2016 | Ingraham ................ E21B 23/01 166/53 |
| 2016/0108722 A1 | 4/2016 | Whitsitt et al. |
| 2016/0168942 A1 | 6/2016 | Broome et al. |
| 2016/0168961 A1 | 6/2016 | Parks et al. |
| 2016/0320769 A1 | 11/2016 | Deffenbaugh et al. |
| 2016/0369620 A1 | 12/2016 | Pelletier et al. |
| 2017/0030693 A1 | 2/2017 | Preiss et al. |
| 2017/0044875 A1 | 2/2017 | Hebebrand et al. |
| 2017/0067303 A1 | 3/2017 | Thiemann et al. |
| 2017/0138150 A1 | 5/2017 | Yencho |
| 2017/0145798 A1 | 5/2017 | Robey et al. |
| 2017/0175428 A1 | 6/2017 | Lisowski et al. |
| 2017/0211363 A1 | 7/2017 | Bradley et al. |
| 2017/0211381 A1 | 7/2017 | Chemali |
| 2017/0226814 A1 | 8/2017 | Clemens et al. |
| 2017/0241244 A1 | 8/2017 | Barker et al. |
| 2017/0268326 A1 | 9/2017 | Tao et al. |
| 2017/0268860 A1 | 9/2017 | Eitschberger |
| 2017/0314372 A1 | 11/2017 | Tolman et al. |
| 2017/0314385 A1 | 11/2017 | Hori et al. |
| 2017/0357021 A1 | 12/2017 | Valero et al. |
| 2018/0030334 A1 | 2/2018 | Collier et al. |
| 2018/0100387 A1 | 4/2018 | Kouchmeshky et al. |
| 2018/0135398 A1 | 5/2018 | Entchev et al. |
| 2018/0148995 A1 | 5/2018 | Burky et al. |
| 2018/0156029 A1 | 6/2018 | Harrison et al. |
| 2018/0209251 A1 | 7/2018 | Robey et al. |
| 2018/0274342 A1 | 9/2018 | Sites |
| 2018/0299239 A1 | 10/2018 | Eitschberger et al. |
| 2018/0305993 A1 | 10/2018 | Perkins et al. |
| 2018/0318770 A1 | 11/2018 | Eitschberger et al. |
| 2018/0340412 A1 | 11/2018 | Singh et al. |
| 2018/0363450 A1 | 12/2018 | Legendre et al. |
| 2019/0031307 A1 | 1/2019 | Siersdorfer |
| 2019/0032470 A1 | 1/2019 | Harrigan |
| 2019/0040722 A1 | 2/2019 | Yang et al. |
| 2019/0048693 A1 | 2/2019 | Henke et al. |
| 2019/0049225 A1 | 2/2019 | Eitschberger |
| 2019/0071963 A1* | 3/2019 | Sites ................ E21B 47/095 |
| 2019/0085685 A1 | 3/2019 | McBride |
| 2019/0195054 A1 | 6/2019 | Bradley et al. |
| 2019/0211655 A1 | 7/2019 | Bradley et al. |
| 2019/0218880 A1 | 7/2019 | Cannon et al. |
| 2019/0284889 A1 | 9/2019 | LaGrange et al. |
| 2019/0292886 A1 | 9/2019 | Shahinpour et al. |
| 2019/0292887 A1 | 9/2019 | Austin, II et al. |
| 2019/0316449 A1 | 10/2019 | Schultz et al. |
| 2019/0322342 A1 | 10/2019 | Dabbous et al. |
| 2019/0368301 A1 | 12/2019 | Eitschberger et al. |
| 2019/0368321 A1 | 12/2019 | Eitschberger et al. |
| 2019/0368331 A1 | 12/2019 | Vick, Jr. et al. |

(56) References Cited

U.S. PATENT DOCUMENTS

| | | | |
|---|---|---|---|
| 2020/0018139 | A1 | 1/2020 | Eitschberger et al. |
| 2020/0063553 | A1 | 2/2020 | Zemla et al. |
| 2020/0088011 | A1 | 3/2020 | Eitschberger et al. |
| 2020/0157909 | A1 | 5/2020 | Fernandes et al. |
| 2020/0332618 | A1 | 10/2020 | Eitschberger et al. |
| 2021/0040809 | A1 | 2/2021 | Eitschberger |
| 2021/0123330 | A1 | 4/2021 | Eitschberger et al. |

FOREIGN PATENT DOCUMENTS

| | | | |
|---|---|---|---|
| CN | 101397890 | A | 4/2009 |
| CN | 101435829 | A | 5/2009 |
| CN | 201620848 | U | 11/2010 |
| CN | 215204636 | U | 12/2021 |
| EP | 1688584 | B1 | 8/2011 |
| EP | 2952675 | A2 | 9/2015 |
| EP | 3478928 | B1 | 6/2021 |
| GB | 839486 | A | 6/1960 |
| GB | 2383236 | B | 1/2004 |
| GB | 2395970 | A | 6/2004 |
| GB | 2548101 | A | 9/2017 |
| GB | 2534484 | B | 4/2020 |
| IN | 201546707 | U | 8/2010 |
| NO | 2018009223 | A1 | 1/2018 |
| RU | 2633904 | C1 | 10/2017 |
| WO | 0159401 | A1 | 8/2001 |
| WO | 2001059401 | A1 | 8/2001 |
| WO | 2009091422 | A2 | 7/2009 |
| WO | 2011051435 | A2 | 5/2011 |
| WO | 2011146866 | A2 | 11/2011 |
| WO | 2011150251 | A1 | 12/2011 |
| WO | 2012006357 | A2 | 1/2012 |
| WO | 2012106640 | A3 | 11/2012 |
| WO | 2012149584 | A1 | 11/2012 |
| WO | 2012161854 | A2 | 11/2012 |
| WO | 2014007843 | A1 | 1/2014 |
| WO | 2014046670 | A1 | 3/2014 |
| WO | 2014089194 | A1 | 6/2014 |
| WO | 2014193397 | A1 | 12/2014 |
| WO | 2015006869 | A1 | 1/2015 |
| WO | 2015028204 | A2 | 3/2015 |
| WO | 2015028204 | A3 | 3/2015 |
| WO | 2015134719 | A1 | 9/2015 |
| WO | 2015196095 | A1 | 12/2015 |
| WO | 2016100064 | A1 | 6/2016 |
| WO | 2017147329 | A1 | 8/2017 |
| WO | 2018067598 | A1 | 4/2018 |
| WO | 2018182565 | A1 | 10/2018 |
| WO | 2019033183 | A1 | 2/2019 |
| WO | 2019180462 | A1 | 9/2019 |
| WO | 2020254099 | A1 | 12/2020 |

OTHER PUBLICATIONS

United States Patent and Trademark Office; Advisory Action Before the Filing of an Appeal Brief for U.S. Appl. No. 16/537,720; dated Dec. 27, 2021; 3 pages.
United States Patent and Trademark Office; Non-Final Office Action for U.S. Appl. No. 17/254,198; dated Dec. 22, 2021; 17 pages.
Owen Oil Tools, Recommended Practice for Oilfield Explosive Safety, Presented at 2011 MENAPS Middle East and North Africa Perforating Symposium, Nov. 28-30, 2011, 6 pages.
Salt Warren et al.; New Perforating Gun System Increases Safety and Efficiency; dated Apr. 1, 2016; 11 pages.
Schlumberger & Said Abubakr, Combining and Customizing Technologies for Perforating Horizontal Wells in Algeria, Presented at 2011 MENAPS, Nov. 28-30, 2011, 20 pages.
Schlumberger, eFire-TCP Firing Head Enabled by Muzic Telemetry, 2016, 2 pgs., www.slb.com/perforating.
Smylie, Tom, New Safe and Secure Detonators for the Industry's consideration, presented at Explosives Safety & Security Conference, Marathon Oil Co, Houston; Feb. 23-24, 2005, 20 pages.

U.S. Patent Trial and Appeal Board, Institution of Inter Partes Review of U.S. Pat. No. 9581422, Case IPR2018-00600, Aug. 21, 2018, 9 pages.
United States District Court for the Southern District of Texas Houston Division, Case 1:19-cv-01611 for U.S. Pat. No. 9,581,422B2, Plaintiff's Complaint and Exhibits, dated May 2, 2019, 26 pgs.
United States District Court for the Southern District of Texas Houston Division, Case 4:19-cv-01611 for U.S. Pat. No. 9,581,422B2, Defendant's Answers, Counterclaims and Exhibits, dated May 28, 2019, 135 pgs.
United States District Court for the Southern District of Texas Houston Division, Case 4:19-cv-01611 for U.S. Pat. No. 9,581,422B2, Plaintiffs' Motion to Dismiss and Exhibits, dated Jun. 17, 2019, 63 pgs.
United States Patent and Trademark Office, Case IPR2018-00600 for U.S. Pat. No. 9,581,422 B2, Reply In Support of Patent Owner's Motion to Amend, dated Mar. 21, 2019, 15 pgs.
United States Patent and Trademark Office, Case IPR2018-00600 for U.S. Pat. No. 9,581,422 B2, Decision of Precedential Opinion Panel, Granting Patent Owner's Request for Hearing and Granting Patent Owner's Motion to Amend, dated Jul. 6, 2020, 27 pgs.
United States Patent and Trademark Office, Case IPR2018-00600 for U.S. Pat. No. 9,581,422 B2, Petitioner's Reply Briefing to the Precedential Opinion Panel, dated Jan. 6, 2020, 17 pgs.
United States Patent and Trademark Office, Case IPR2018-00600 for U.S. Pat. No. 9,581,422 B2, Petitioner's Reply in Inter Partes Review of Patent No. 9,581,422, dated Mar. 7, 2019, 44 pgs.
United States Patent and Trademark Office, Final Office Action of U.S. Appl. No. 16/542,890, dated May 12, 2020, 16 pgs.
United States Patent and Trademark Office, Final Office Action of U.S. Appl. No. 16/423,230, dated Nov. 4, 2019, 14 pgs.
United States Patent and Trademark Office, Non-final Office Action of U.S. Appl. No. 16/451,440, dated Oct. 24, 2019, 22 pgs.
United States Patent and Trademark Office, Notice of Allowance for U.S. Appl. No. 16/788,107, dated Jul. 30, 2020, 9 pgs.
United States Patent and Trademark Office, Office Action of U.S. Appl. No. 16/423,230, dated Aug. 27, 2019, 16 pgs.
United States Patent and Trademark Office; Final Office Action for U.S. Appl. No. 16/451,440; dated Feb. 7, 2020; 11 pages.
United States Patent and Trademark Office; Non-Final Office Action for U.S. Appl. No. 16/542,890; dated Nov. 4, 2019; 16 pages.
United States Patent and Trademark Office; Non-Final Office Action for U.S. Appl. No. 16/542,890; dated Sep. 30, 2020; 17 pages.
United States Patent and Trademark Office; Notice of Allowance for U.S. Appl. No. 16/451,440; dated Jun. 5, 2020; 8 pages.
United States Patent and Trademark Office; Requirement for Restriction/Election for U.S. Appl. No. 16/537,720; dated Apr. 27, 2021; 8 pages.
USPTO, Notice of Allowance for U.S. Appl. No. 16/423,230, dated Nov. 27, 2019, 7 pgs.
USPTO, Office Action of US App. No. 16/788, 107, dated Apr. 6, 2020, 15 pgs.
European Patent Office; Rule 161 Communication for EP Application No. 20746535.2; dated Mar. 1, 2022; 3 pages.
International Searching Authority; International Preliminary Report on Patentability of the International Searching Authority for PCT/EP2020/070291; dated Feb. 3, 2022; 8 pages.
International Searching Authority; International Preliminary Report on Patentability of the International Searching Authority for PCT/EP2020/075788; dated Mar. 31, 2022; 10 pages.
United States Patent and Trademark Office; Non-Final Office Action for U.S. Appl. No. 16/537,720; dated Jan. 26, 2022; 15 pages.
United States Patent and Trademark Office; Non-Final Office Action for U.S. Appl. No. 16/919,473; dated Feb. 8, 2022; 12 pages.
United States Patent and Trademark Office; Non-Final Office Action for U.S. Appl. No. 17/072,067; dated Mar. 31, 2022; 15 pages.
United States Patent and Trademark Office; Non-Final Office Action for U.S. Appl. No. 17/608,173; dated Mar. 29, 2022; 5 pages.
United States Patent and Trademark Office; Notice of Allowance for U.S. Appl. No. 16/537,720; dated Apr. 21, 2022; 9 pages.
United States Patent and Trademark Office; Patent Trial and Appeal Board Decision on Appeal; dated Apr. 11, 2022; 12 pages.

(56) References Cited

OTHER PUBLICATIONS

Entchev et al., "Autonomous Perforating System for Multizone Completions," SPE 147296, Prepared for Presentation at Society of Petroleum Engineers (SPE) Annual Technical Conference and Exhibition held Oct. 30, 2011-Nov. 2, 2011, 7 pgs.
United States Patent and Trademark Office; Advisory Action Before the Filing of an Appeal Brief for U.S. Appl. No. 17/254,198; dated Aug. 2, 2022; 3 pages.
United States Patent and Trademark Office; Notice of Allowance for U.S. Appl. No. 17/072,067; dated Aug. 12, 2022; 10 pages.
International Searching Authority; International Search Report and Written Opinion for PCT Appl PCT/EP2020/065180; dated Oct. 6, 2020; 11 pages.
Amit Govil, Selective Perforation: A Game Changer in Perforating Technology—Case Study, presented at the 2012 European and West African Perforating Symposium, Schlumberger, Nov. 7-9. 2012, 14 pgs.
Austin Powder Company; A-140 F & Block, Detonator & Block Assembly; Jan. 5, 2017; 2 pgs.; https://www.austinpowder.com/wp-content/uploads/2019/01/OilStar_A140Fbk-2.pdf.
Baker Hughes, Long Gun Deployment Systems IPS-12-28; 2012 International Perforating Symposium; Apr. 26-27, 2011; 11 pages.
Baker Hughes; SurePerf Rapid Select-Fire System Perforate production zones in a single run; 2012; 2 pages.
Dynaenergetics, DYNAselect Electronic Detonator 0015 SFDE RDX 1.4B, Product Information, Dec. 16, 2011, 1 pg.
Dynaenergetics, DYNAselect Electronic Detonator 0015 SFDE RDX 1.4S, Product Information, Dec. 16, 2011, 1 pg.
Dynaenergetics, DYNAselect System, information downloaded from website, Jul. 3, 2013, 2 pages, http://www.dynaenergetics.com/.
Dynaenergetics, Electronic Top Fire Detonator, Product Information Sheet, Jul. 30, 2013, 1 pg.
Dynaenergetics, Gun Assembly, Product Summary Sheet, May 7, 2004, 1 page.
Dynaenergetics, Selective Perforating Switch, information downloaded from website, Jul. 3, 2013, 2 pages, http:// www.dynaenergetics.com/.
Dynaenergetics, Selective Perforating Switch, Product Information Sheet, May 27, 2011, 1 pg.
Entchev et al., Autonomous Perforating System for Multizone Completions, SPE International, 2011, 7 pgs., https://www.onepetro.org/conference-paper/SPE-147296-MS.
Ge Oil & GAS, Pipe Recovery Technology & Wireline Accessories, 2013, 435 pages.
Gilliat et al.; New Select-Fire System: Improved Reliability and Safety in Select Fire Operations; 2012; 16 pgs.
Giromax Directional, Gyroscopic and magnetic borehole surveying systems with outstanding quality andreliability, Feb. 14, 2016, 4 pgs., https://www.gyromax.com.au/inertial-sensing.html.
GR Energy Services, ZipRelease Addressable Wireline Release Tool, Dec. 8, 2016, 2 pgs.,https://grenergyservices.com/completion-services/perforating/addressable-wireline-release.
Halliburtion, World's first acoustic firing head system allows safer and more flexible TCP operations, Aug. 2015, 2 pgs., https://www.halliburton.com/content/dam/ps/public/lp/contents/Case_Histories/web/acoustic-firing-tcp.pdf.
Halliburton, Maxfire Electronic Firing Systems, Nov. 2014, 7 pgs., https://www.halliburton.com/content/dam/ps/public/lp/contents/Brochures/web/MaxFire.pdf.
Halliburton, Releasable Cable Heads, 1 pg., Mar. 23, 2018, https://www.halliburton.com/en-US/ps/wireline-perforating/wireline-and-perforating/deployment-risk-avoidance/releasable-wireline-cable-head-rwch-tool.html.
Halliburton, Releasable Wireline Cable Head (RWCH Tool), 2016, 2 pgs., https://www.halliburton.com/content/ dam/ps/public/lp/contents/Data_Sheets/web/H/Releasable-Wireline-Cable-Head-Tool-RWCH.pdf.
Halliburton, RexConnect—Have a dialogue with your reserviour, 2015, 8 pgs., https://www.halliburton.com/content/dam/ps/public/ts/contents/Brochures/web/RezConnectBrochure.pdf.
Halliburton; Wireline and Perforating Advances in Perforating; dated Nov. 2012; 12 pages.
Harrison Jet Gun Xtra Penetrator, website visited Nov. 29. 2018, 1 pg., https://www.google.com/search?q=harrison+jet+gun+xtra+penetrator&client=firefox-b-1-d&source=lnms&tbm=isch&sa=X&ved=0ahUKEwjYOKOQ1YTjAhXHmeAKHa00DeYQ_AUIESgC&biw=1440&bih=721#imgrc=ZlqpUcJ_-TL3IM.
Horizontal Wireline Services, Presentation of a completion method of shale demonstrated through an example of Marcellus Shale, Pennsylvania, USA, Presented at 2012 International Perforating Symposium (Apr. 26-28, 2012), 17 pages.
Hunting Energy Service, ControlFire RF Safe ControlFire® RF-Safe Manual, 33 pgs., Jul. 2016, http://www.hunting-intl.com/media/2667160/ControlFire%20RF_Assembly%20Gun%20Loading_Manual.pdf.
Hunting Titan Inc .; Petition for Post Grant Review of U.S. Patent No. 10,429, 161; dated Jun. 30, 2020; 109 pages.
Hunting Titan, Wireline Top Fire Detonator Systems, Nov. 24, 2014, 2 pgs, http://www.hunting-intl.com/titan/perforating-guns-and-setting-tools/wireline-top-fire-detonator-systems.
International Searchiing Authority, International Search Report and Written Opinion of International App. No. PCT/EP2019/063966, dated Aug. 30, 2019, 10 pages.
International Searching Authority, International Search Report and Written Opinion for PCT App. No. PCT/IB2019/000526; dated Sep. 25, 2019, 17 pgs.
International Searching Authority, International Search Report and Written Opinion for PCT App. No. PCT/IB2019/000530; dated Oct. 8, 2019; 13 pgs.
International Searching Authority, The International Search Report and Written Opinion of International App. No. PCT/IB2019/000537, dated Sep. 25, 2019, 18 pgs.
International Searching Authority; Communication Relating to the Results of the Partial International Search for PCT/EP2020/070291; dated Oct. 20, 2020; 8 pages.
International Searching Authority; International Preliminary Report on Patentability for International Application No. PCT/IB2019/000537; dated Dec. 10, 2020; 11 pages.
International Searching Authority; International Preliminary Report on Patentability for International Application No. PCT/IB2019/000526; dated Dec. 10, 2020; 10 pages.
International Searching Authority; International Preliminary Report on Patentability for PCT/EP2019/066919; dated Jan. 7, 2021; 9 pages.
International Searching Authority; International Preliminary Report on Patentability for PCT/IB2019/000530; dated Jan. 7, 2021; 9 pages.
International Searching Authority; International Preliminary Report on Patentability International Application No. PCT/EP2019/063966; dated Dec. 10, 2020; 7 pages.
International Searching Authority; International Preliminary Report on Patentability of the International Searching Authority for PCT/EP2019/072064; dated Feb. 25, 2021; 9 pages.
International Searching Authority; International Preliminary Report on Patentability of the International Searching Authority for PCT/EP2019/072032; dated Mar. 4, 2021; 9 pages.
International Searching Authority; International Search Report and Written Opinion for PCT App. No. PCT/EP2019/066919; dated Sep. 10, 2019; 11 pages.
International Searching Authority; International Search Report and Written Opinion for PCT App. No. PCT/EP2019/072032; dated Nov. 15, 2019; 13 pages.
International Searching Authority; International Search Report and Written Opinion for PCT App. No. PCT/EP2019/072064; dated Nov. 20, 2019; 15 pages.
International Searching Authority; International Search Report and Written Opinion of the International Searching Authority for PCT/EP2020/075788; dated Mar. 16, 2021; 17 pages.
International Searching Authority; International Search Report and Written Opinion of the International Searching Authority for PCT/EP2020/070291; dated Dec. 15, 2020; 14 pages.

(56) References Cited

OTHER PUBLICATIONS

International Searching Authority; Invitation to Pay Additional Fees with Partial International Search for Application No. PCT/EP2020/075788; dated Jan. 19, 2021; 9 pages.
Jet Research Center Inc., JRC Catalog, 2008, 36 pgs., https://www.jetresearch.com/content/dam/jrc/Documents/Books_Catalogs/06_Dets.pdf.
Jet Research Center Inc., Red RF Safe Detonators Brochure, 2008, 2 pages, www.jetresearch.com.
Merol Applied Intelligence, Matrix Roxar Metrol Wireless Interface, 1 pg., https://www.metrol.co.uk/assets/docs/datasheets/MET-MATRIX-V01.pdf.
Micro Smart Systems, Slickline Triggers & Perforators, 1 pg., https://www.micro-smart.com/pdf/slickline_trigger_overview.pdf.
Owen Oil Tools & Pacific Scientific; RF-Safe Green Det, Side Block for Side Initiation, Jul. 26, 2017, 2 pgs.
Office Action issued in Argentina Application No. 20190102833 dated Apr. 19, 2023, 6 pages.

* cited by examiner

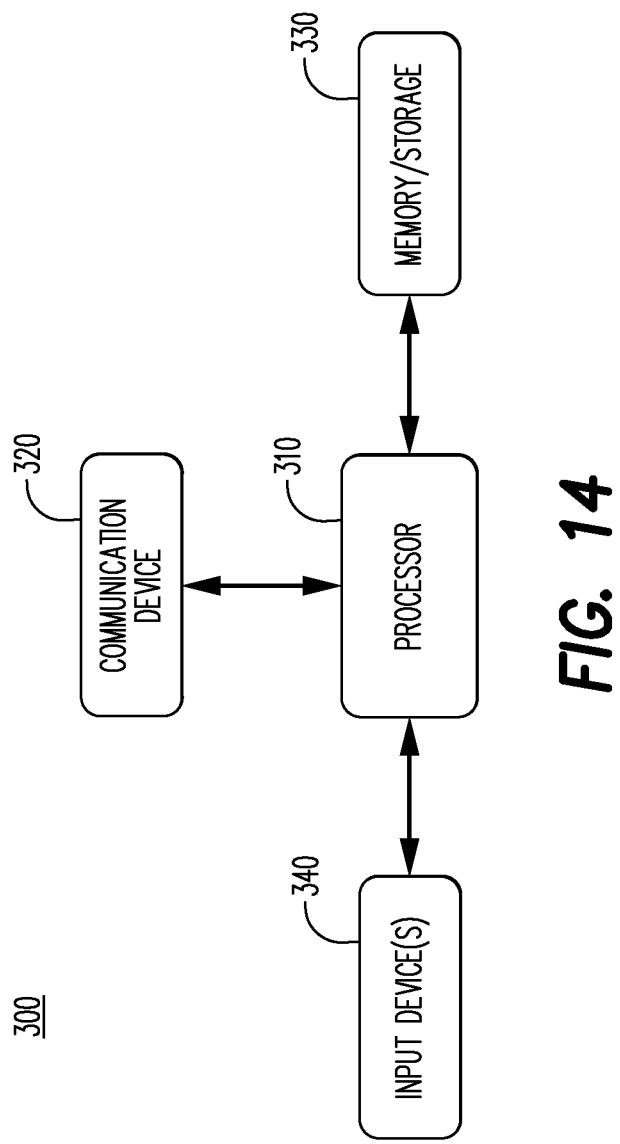

SYSTEMS AND METHODS FOR MARKER INCLUSION IN A WELLBORE

CROSS-REFERENCE TO RELATED APPLICATIONS

This application is a national phase of and claims priority to Patent Cooperation Treaty (PCT) Application No. PCT/IB2019/000537 filed Mar. 18, 2019, which claims the benefit of U.S. Provisional Patent Application No. 62/678,636 filed May 31, 2018, each of which is incorporated herein by reference in its entirety.

BACKGROUND OF THE DISCLOSURE

In oil and gas wells, a wellbore 105, as illustrated in FIG. 1 is a narrow shaft drilled in the ground, vertically, deviated and/or horizontally. A wellbore 105 can include a substantially vertical portion and a substantially horizontal portion and a typical wellbore may be over a mile in depth (e.g., the vertical portion) and several miles in length (e.g., the horizontal portion). The wellbore 105 is usually fitted with wellbore casing 110 that includes multiple segments (e.g., 100 foot segments) that are held together by couplers 115. A coupler 115 (e.g., a collar), as illustrated in FIG. 2, may connect two sections of wellbore casing 110 and 110'. The coupler 115 may include threaded portion 116 on an interior surface to matingly connect with a threaded portion 111 on an exterior surface of the casing 110 or may use other means to connect two wellbore casing segments.

In the oil and gas industry, a wireline, electric line or e-line are cabling technology that is used to lower and retrieve equipment or measurement devices into and out of an oil or gas well for the purpose of delivering an explosive charge, evaluation of the wellbore or other well-related tasks. Other methods include tubing conveyed (i.e., TCP for perforating) or coil tubing conveyance. A speed of unwinding a wireline cable and winding the wireline cable back up is limited based on a speed of the wireline equipment and forces on the wireline cable itself (e.g. friction within the well). Because of these limitations, it typically can take several hours for a wireline cable to be lowered into a well and another several hours for the wireline cable to be wound back up. When detonating explosives, the wireline cable will be used to position a vehicle (e.g., a perforating gun) containing the explosives into the wellbore. After the explosives are detonated, the wireline cable, with the attached vehicle, will have to be extracted from the well.

Wireline cables and TCP systems also have other limitations such as becoming damaged after multiple uses in the wellbore due to, among other issues, friction associated with the wireline cable rubbing against the sides of the wellbore. Location within the wellbore is based on an amount of wireline cable being sent into the well and thus, the use of wireline may be a critical, and time consuming, component in the oil and gas industry. It would therefore be desirable to provide a system that can minimize or even eliminate the use of wireline cables for activity within a wellbore.

BRIEF DESCRIPTION OF THE EXEMPLARY EMBODIMENTS

Some embodiments described herein relate to a system for determining a location of an untethered drone/vehicle in a wellbore. The system includes one or more markers to be placed within a wellbore casing where each of the one or more markers is configured to transmit a continuous or periodic signal. The system further includes a first sensor to be transported by an untethered drone where the first sensor is configured to sense an existence of the one or more markers.

A technical advantage of some embodiments disclosed herein are the ability to perform operations within a wellbore without the use of a cable system, telemetry and/or any kind/type of signal passing back to surface and vice versa by determining a location of an untethered drone within the wellbore.

BRIEF DESCRIPTION OF THE DRAWINGS

A more particular description will be rendered by reference to specific embodiments thereof that are illustrated in the appended drawings. Understanding that these drawings depict only typical embodiments thereof and are not therefore to be considered to be limiting of its scope, exemplary embodiments will be described and explained with additional specificity and detail through the use of the accompanying drawings in which:

FIG. 14 illustrates a sensor system according to some embodiments.

Figure 1:
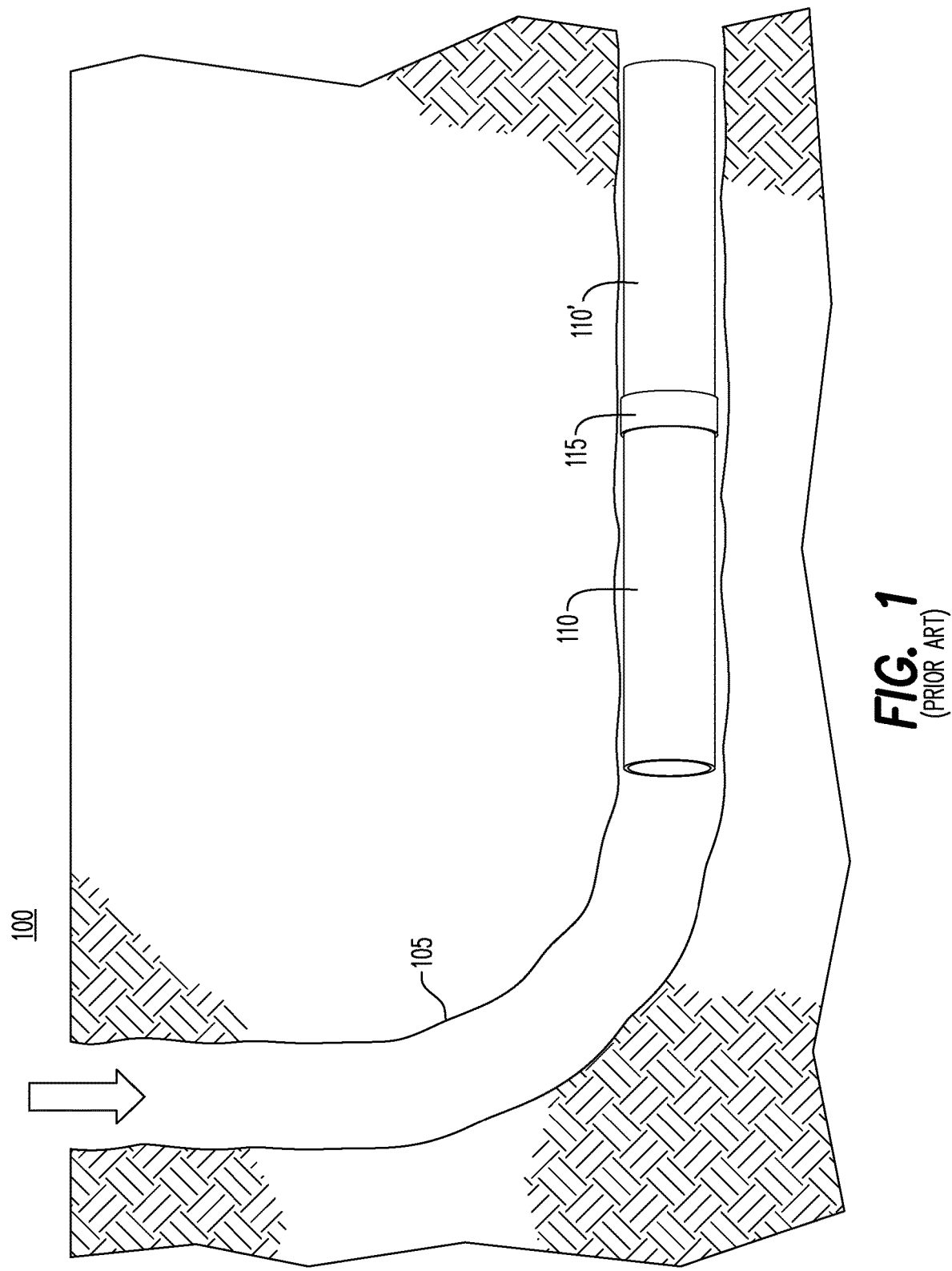
FIG. 1 illustrates a wellbore as known.
Figure 2:
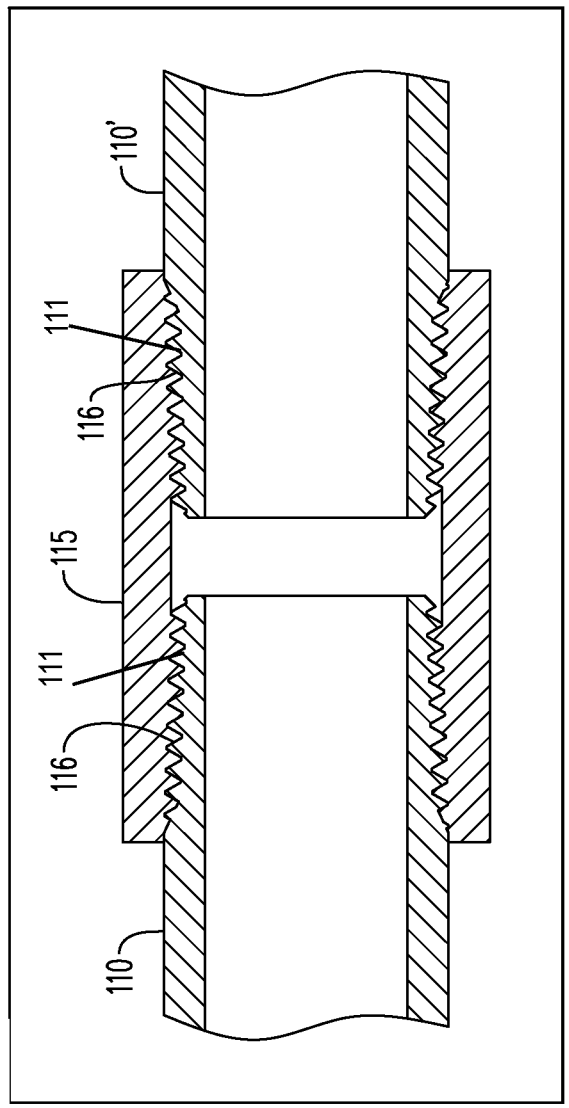
FIG. 2 illustrates a wellbore coupler as known.

Various features, aspects, and advantages of the embodiments will become more apparent from the following detailed description, along with the accompanying figures in which like numerals represent like components throughout the figures and text. The various described features are not necessarily drawn to scale, but are drawn to emphasize specific features relevant to some embodiments.

The headings used herein are for organizational purposes only and are not meant to limit the scope of the description or the claims. To facilitate understanding, reference numerals have been used, where possible, to designate like elements common to the figures.

DETAILED DESCRIPTION

Reference will now be made in detail to various embodiments. Each example is provided by way of explanation and is not meant as a limitation and does not constitute a definition of all possible embodiments. In the following detailed description, numerous specific details are set forth in order to provide a thorough understanding of the embodiments. However, the embodiments may be practiced without these specific details. In other instances, well-known methods, procedures, components and circuits have not been described in detail so as not to obscure the embodiments.

The present embodiments relate to the use of an untethered drone that is operated within a wellbore casing. In particular, the present embodiments relate to a system and method of determining a location of the untethered drone within the wellbore casing using markers that transmit continuous or periodic signals. The markers used for transmitting continuous or periodic signals may include, but are not limited to, electronic beacons, mechanical beacons, optical markers, chemical markers, or radioisotope markers. All of the markers described herein may be implemented into a plug or circlet that may be inserted at any desirable location within a wellbore casing (e.g., in or co-extensive with a coupler).

Figure 3:
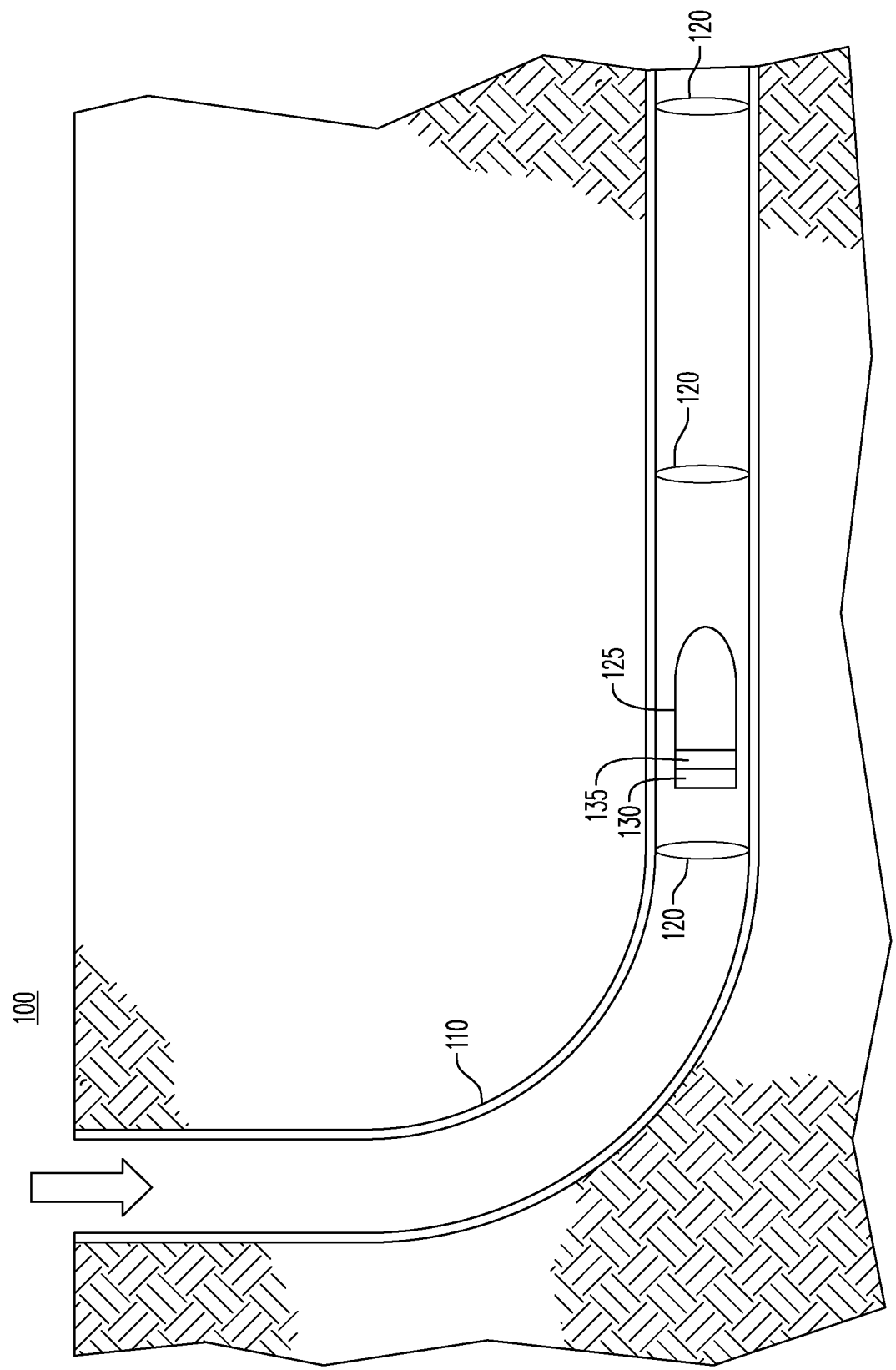
FIG. 3 illustrates an untethered drone within a wellbore in accordance with some embodiments.

Now referring to FIG. 3, an embodiment of a system 100 is illustrated. The system 100 may include one or more markers 120 that may be sensed by an untethered drone 125. The markers may transmit a continuous or periodic signal and a type of signal may be based on a type of marker that is being used in the wellbore. For example, markers may include electrical markers (e.g., beacons), chemical markers, radioisotope markers or mechanical markers. As will be described in greater detail herein below, the untethered drone 125 may include one or more sensors 130/135 to receive the continuous or periodic signal transmitted from the one or more markers 120. The one or more sensors 130/135 may be configured to receive a signal from a type of marker that is implemented in the wellbore casing 110. Multiple sensors 130 and 135 may be used along a length of the untethered drone 125 to provide for a longer opportunity for the sensors 130/135 to sense the one or more markers 120.

The untethered drone 125 may be inserted into the wellbore casing at a top of the wellbore 105 and moved through the wellbore 110 using a flow of a fluid (e.g., water, salt water, sand and water mixture, or a mixture of water and other elements) or it may include some sort of self-propulsion system. The fluid also enters the wellbore casing at the top of the wellbore 105. The fluid may flow at a rate of speed greater than about 200 feet per minute. In some embodiments, the fluid may flow at a rate of speed between about 600 feet per minute and about 1800 feet per minute. (e.g. between about 7 and 20 miles per hour).

The wellbore casing 110 may be greater than one mile in length and between 2⅞ and 7 inches in diameter (e.g., measured based on an outer dimension). In some embodiments, the wellbore casing may be measured based on circumference. For example, the wellbore casing 110 may be in a range of 10 to 25 inches in circumferences. During operation, a temperature within the wellbore casing may be greater than about 25° C./77° F. and, in some embodiments, the temperature within the wellbore may be between about 40° C./104° F. and 90° C./194° F. Accordingly, the untethered drone may need to be able to withstand, and communicate in, a high speed and high heat environment.

As the drone approaches, or passes next to, each of the one or more markers 120, the drone may sense an existence of the marker. Sensing may include receiving a signal or receiving information from the one or more markers (as will be described in further detail below).

Figure 4:
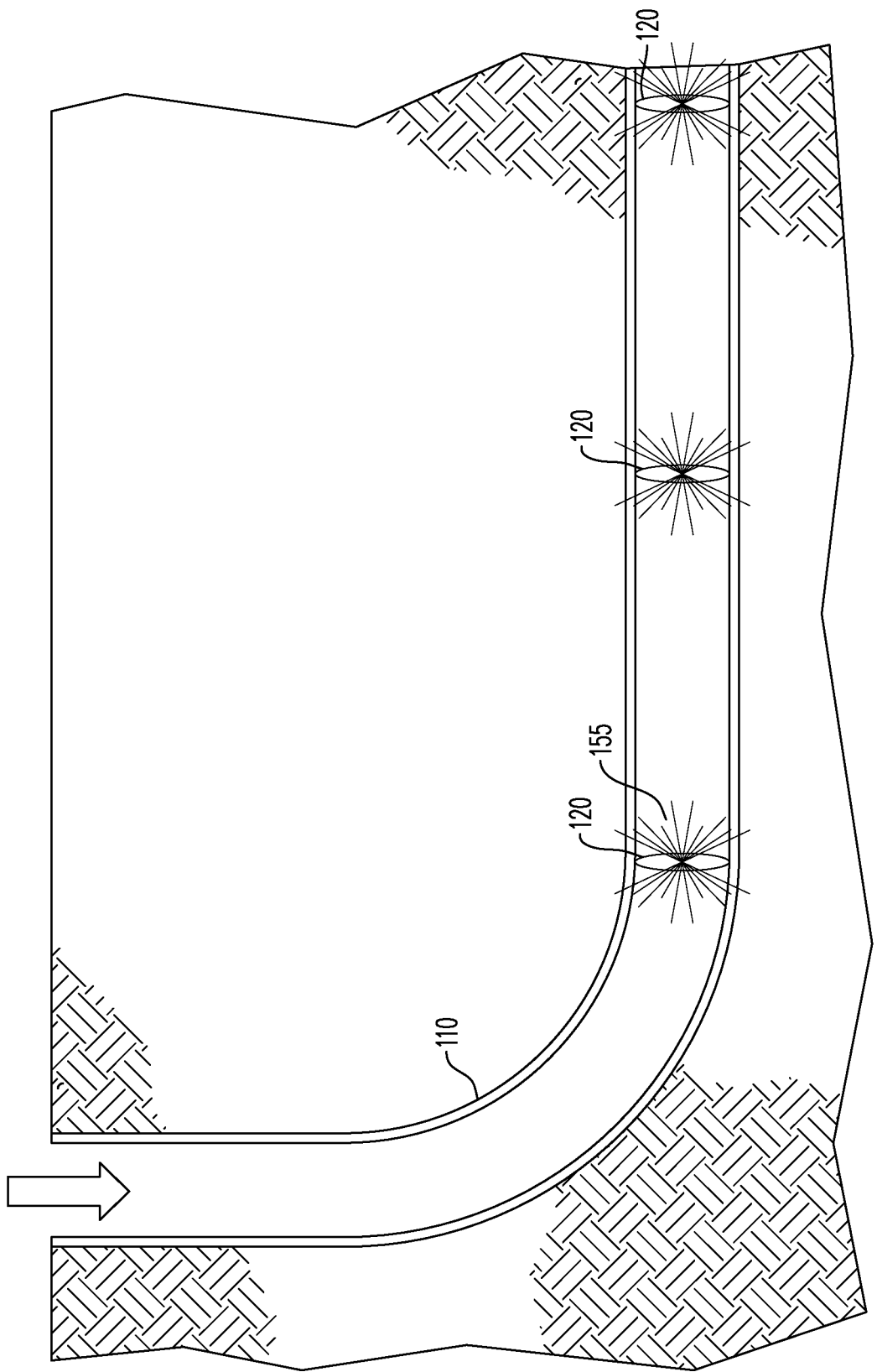
FIG. 4 illustrates a plurality of receiving zones within a wellbore in accordance with some embodiments.

As illustrated in FIGS. 3 & 4, each of the one or more markers 120 may define a receiving zone 155 in which the markers may be sensed by sensors 130/135. Each receiving zone 155 may define a unique range within which the one or more markers can be sensed. The unique range may be based on current environmental conditions (e.g., temperature, salinity of the wellbore fluid, etc.). Environmental conditions may limit a range that a marker's signal may be received. Furthermore, the one or more markers may be spaced apart such that their associated receiving zones may not create an overlap with other receiving zones.

Figure 5:
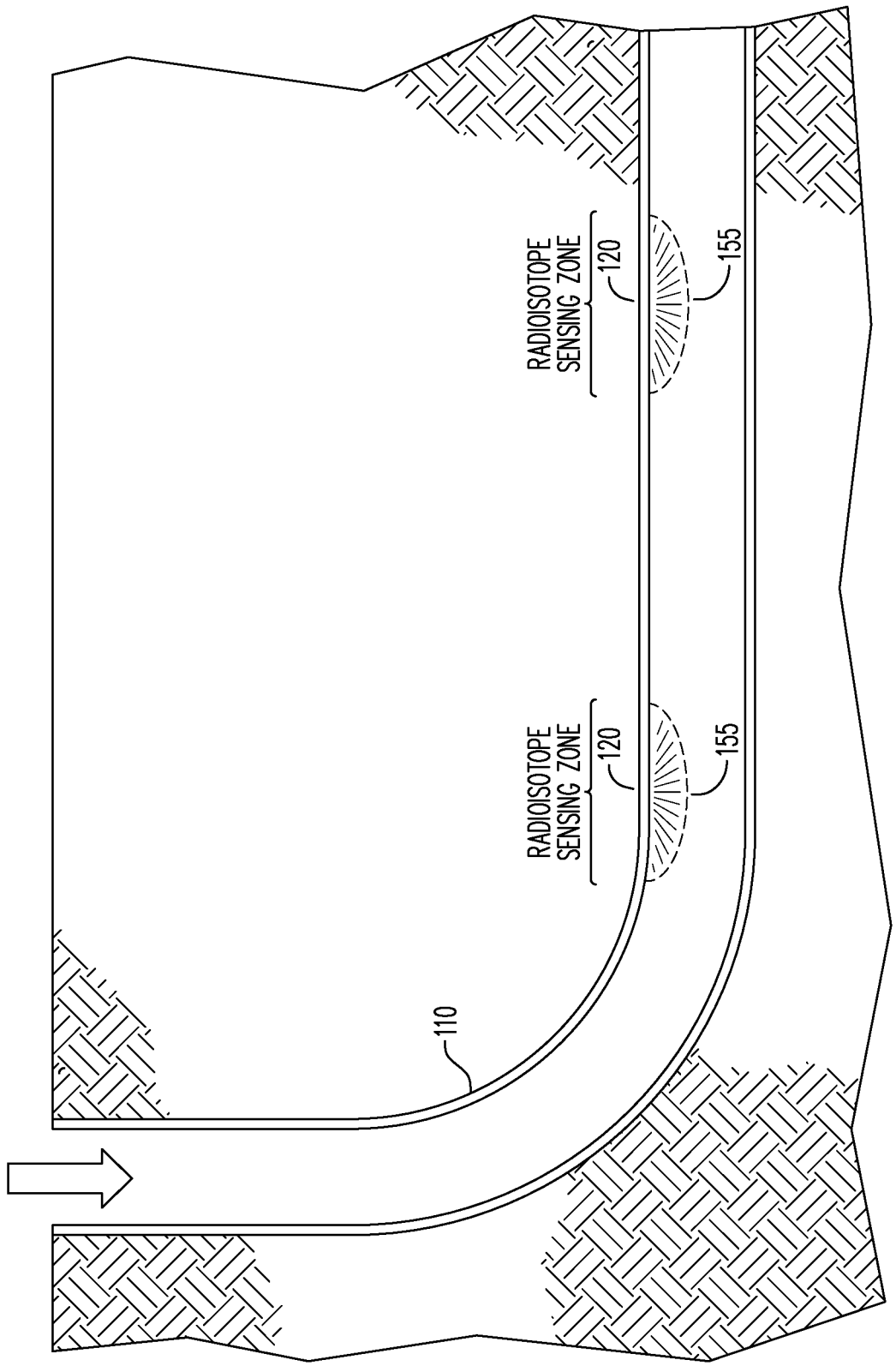
FIG. 5 illustrates a plurality of receiving zones within a wellbore in accordance with some embodiments.

Referring now to FIG. 5, in some embodiments, the one or more markers 120 may comprise a radioisotope. As such, a receiving zone 155 may be based on a range in which the radioisotope may be sensed. In some embodiments, a radioisotope, such as americium-241, may be used. Americium-241 is commonly used in smoke detectors and emits both alpha particles and low energy gamma rays. When the emitted alpha particles collide with oxygen and nitrogen, ions may be produced which generate a low-level electric voltage. This low-level electric voltage may be sensed by sensors 130/135 that are configured to detect this form of low-level electric voltage in the receiving zone 155. To implement such one or more markers 120 including a radioisotope, the radioisotope may be coated on specific regions of the wellbore casing. For example, an interior of the wellbore casing 110 may be coated with a radioisotope or the radioisotope may be adhered to an interior surface of the coupler 115 disposed between different sections of the wellbore casing 110. In some embodiments, a plug, or circlet including the radioisotope may be placed into the wellbore casing 110 or the coupler 115 as described in greater detail herein below.

Figure 6:
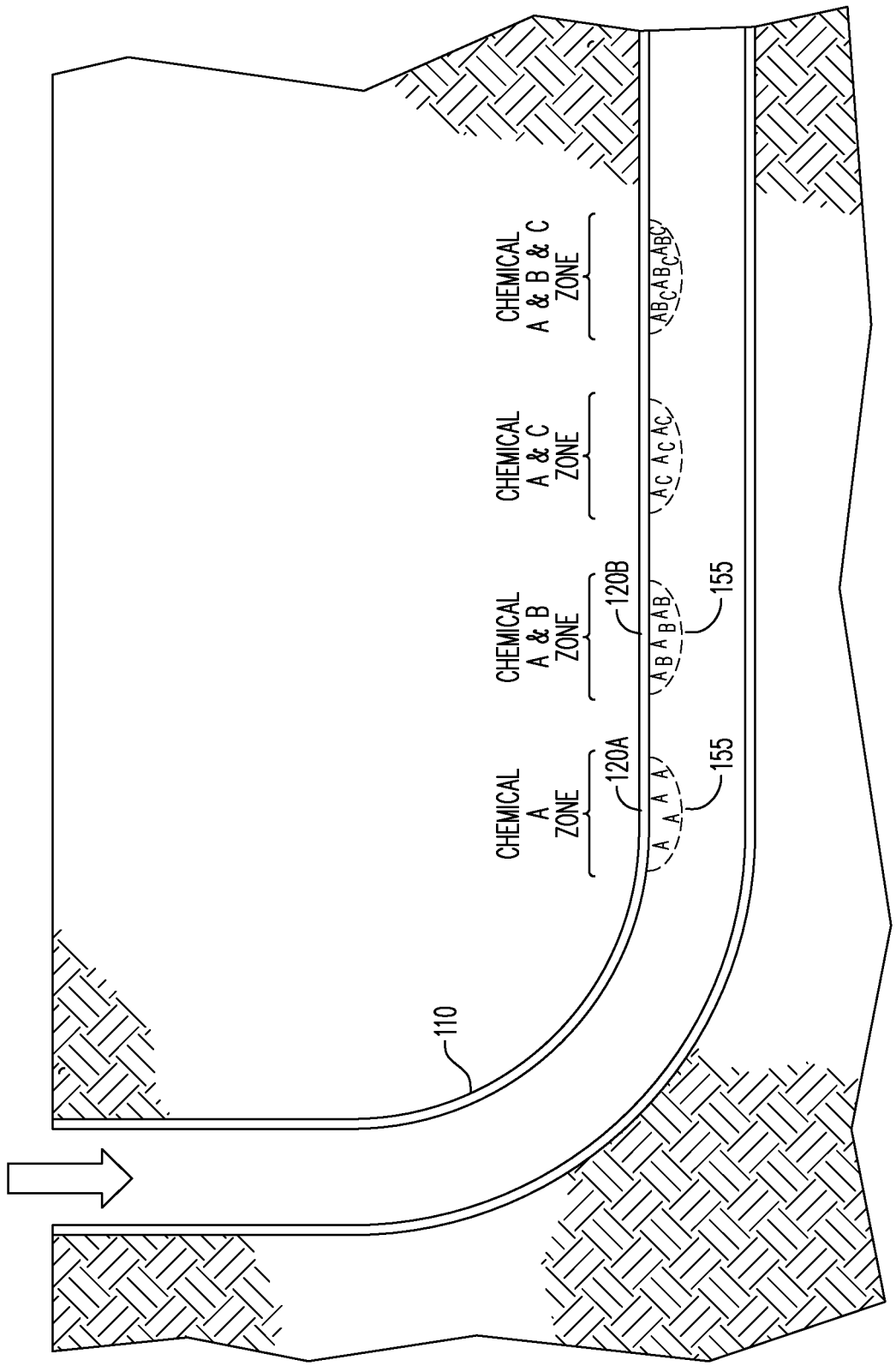
FIG. 6 illustrates a plurality of receiving zones within a wellbore in accordance with some embodiments.

Now referring to FIG. 6, in some embodiments, the one or more markers 120 may be chemical based and may be implemented by using a coating on an interior surface of the wellbore casing 110 or coupler 115 or by inserting a plug or circlet into the wellbore casing that is coated or includes one or more chemicals. The one or more chemicals may include a combination of different chemicals that may be sensed by a sensor 130. The sensor 130 may be able to distinguish between different chemicals or combinations of chemicals. By being able to distinguish between different chemicals or combinations, the untethered drone 125 may be able to distinguish between different receiving zones based on a combination of chemicals. For example, in a case where three chemicals (e.g., chemical A, chemical B and chemical C) are used in combination, a total of six locations may be distinguished through the combination of such chemicals (e.g., A by itself, B by itself, C by itself, A&B in combination, A&C in combination, and A&B&C in combination) will produce 6 different and distinguishable combinations that can be sensed. This is illustrated in FIG. 6 which indicates a first marker 120A made of chemical A having a receiving zone 155 where chemical A is the only chemical sensed. A second marker 120B made of a combination of chemical A and chemical B has a receiving zone 155 where both chemical A and chemical B are the only chemicals sensed. In some embodiments, chemicals, such as, but not limited to, radioactive chemicals, stable isotopes, fluorescent dyes, inorganic ions, and aromatic acids may be used. For example, Fluorescein may be used since it is stable in conditions as hot as 250 degrees Celsius/482 degrees Fahrenheit and may be detected in very low concentrations (e.g., 10 parts per trillion).

By using unique markers, a specific location may be determined within the wellbore casing. For example, when the sensor 130 is pre-programmed to sense only chemicals A&B combined, the sensor may indicate to the untethered drone that such combination is sensed and an action may be implemented based on this determined location. Locations within the wellbore may be known to users who program the untethered drone (e.g., the combination of chemicals A&B is known as coupler #6). This may allow for the user who programs the untethered drone and the untethered drone to distinguish between different markers within a wellbore casing 110. The message structure for a chemical-based marker may only include its presence detected.

However, for other markers, such as, but not limited to electronic markers (e.g. beacons), the one or markers 120 may transmit data in a data packet to the sensor 130. For example, a message structure for an electronic marker may include a unique beacon ID (BID), a text field, and cyclical redundancy check (CRC). Electronic markers may transmit continuous or periodic radio frequency (RF) signals. To save on battery life, electronic markers may transmit periodic signals instead of continuous signals. Since a sensor 130 may pass through a receiving zone, and potentially miss a periodic signal, the one or more markers 120 may work in conjunction to offset individual periodic signals to create, in effect, a continuous signal at a receiving zone. For example, a first of the one or more markers 120 may transmit during a first time period, a second of the one or more markers may transmit at a second time period and a third of the one or more markers may transmit at a third time period wherein the first time period, the second time period and the third time period are different time periods. In this regard, the receiving zone will have a continuous signal that is capable of being received by the sensor 130 and each individual marker may not have to transmit continuously which may save battery life of the one or more markers 120. To avoid overlap of the signals transmitted from the one or more markers 120, the markers may be spaced such that there is no overlap of transmitted signals between receiving zones. In some embodiments, the markers 120 may transmit, reflect, refract or absorb light from a light source (e.g., one or more LED lights) which may be received by the sensor 130. For example, the markers 120 may transmit using light fidelity (LI-FI) based on blinking or flashing lights. In some embodiments, the markers 120 may include a reflection surface to reflect light from another source and may, in some embodiments, function as a continuous reflection point. In this embodiment, the markers 120 may reflect a light at a specific frequency or wavelength. The markers 120 may include a reflection surface that functions as a spectral reflection/absorption point that reflects some wavelengths of light at a specific frequency or wavelength and absorb other wavelengths of light at a specific frequency or wavelength. In some embodiments, the untethered drone may emit light at different wavelengths. For example, the untethered drone may move or shift the emitted light from one wavelength to one or more other wavelengths at a constant frequency. In this embodiment, a sensor (e.g., a sensor array) on the untethered drone may sense multiple frequencies and, as such, may be capable of calculating a speed of the untethered drone using a timing and a frequency that is received from the markers 120.

Figure 7:
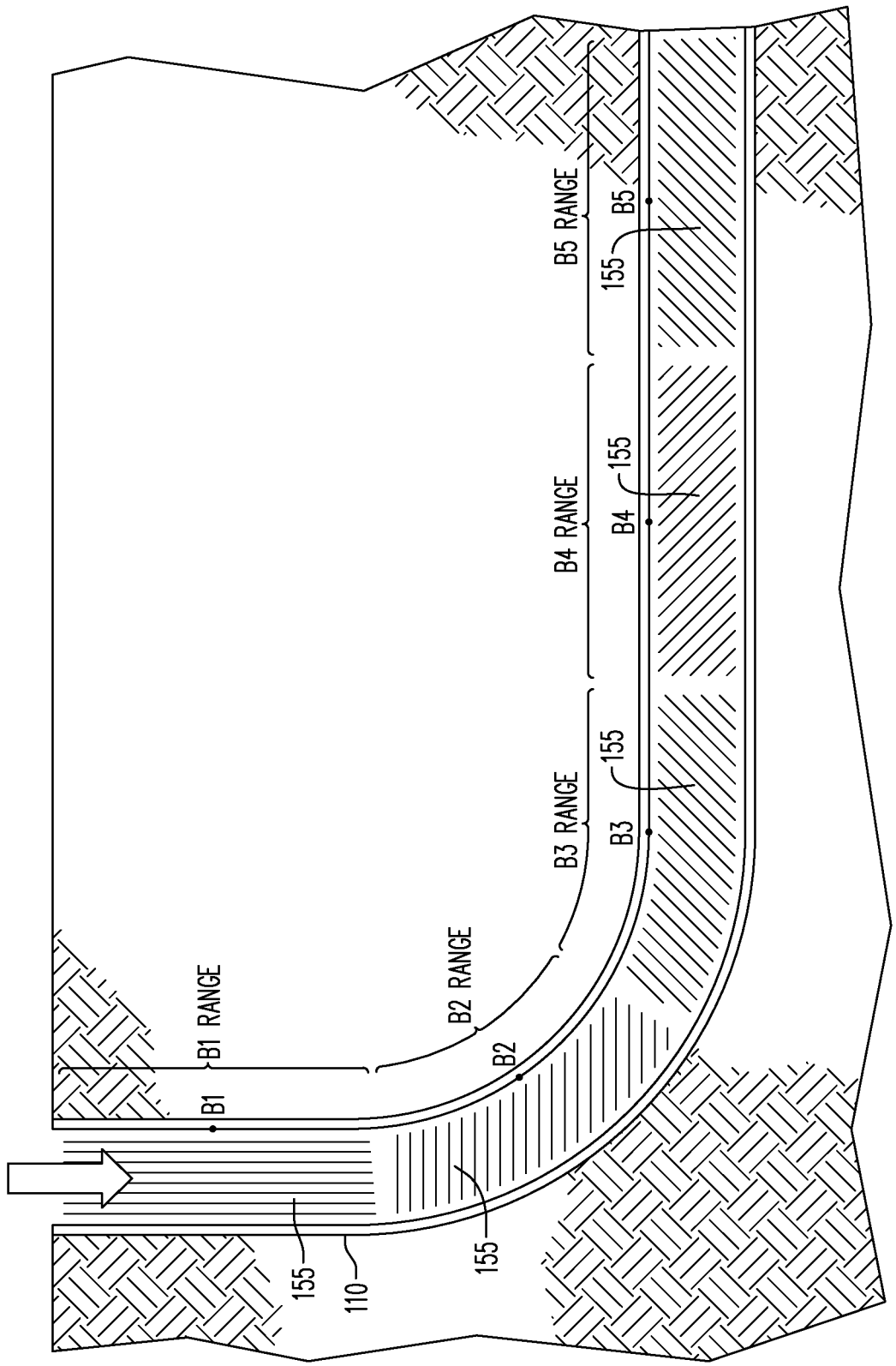
FIG. 7 illustrates a plurality of receiving zones within a wellbore in accordance with some embodiments.

As illustrated in FIG. 7, all of the markers described herein may have a known, controlled/limited receiving zone such that markers may be isolated to prevent two adjacent markers from being capable of being sensed in an adjacent receiving zone. In some embodiments, the sensor 130 (not shown in this figure) may be able to distinguish between different receiving zones (e.g., different chemicals, different transmitted frequencies, etc.) illustrated as B1-B5 and their associated markers, when flowing through the wellbore casing 110. FIG. 7 illustrates an example embodiment in which makers are positioned as close to each other to maintain a longest period for receipt of the signal by the sensor within each receiving zone by each particular marker. Different marker locations may be distinguished based on a frequency being received, or in the case of a chemical beacon, the presence of a particular chemical or combination of chemicals.

Figure 8:
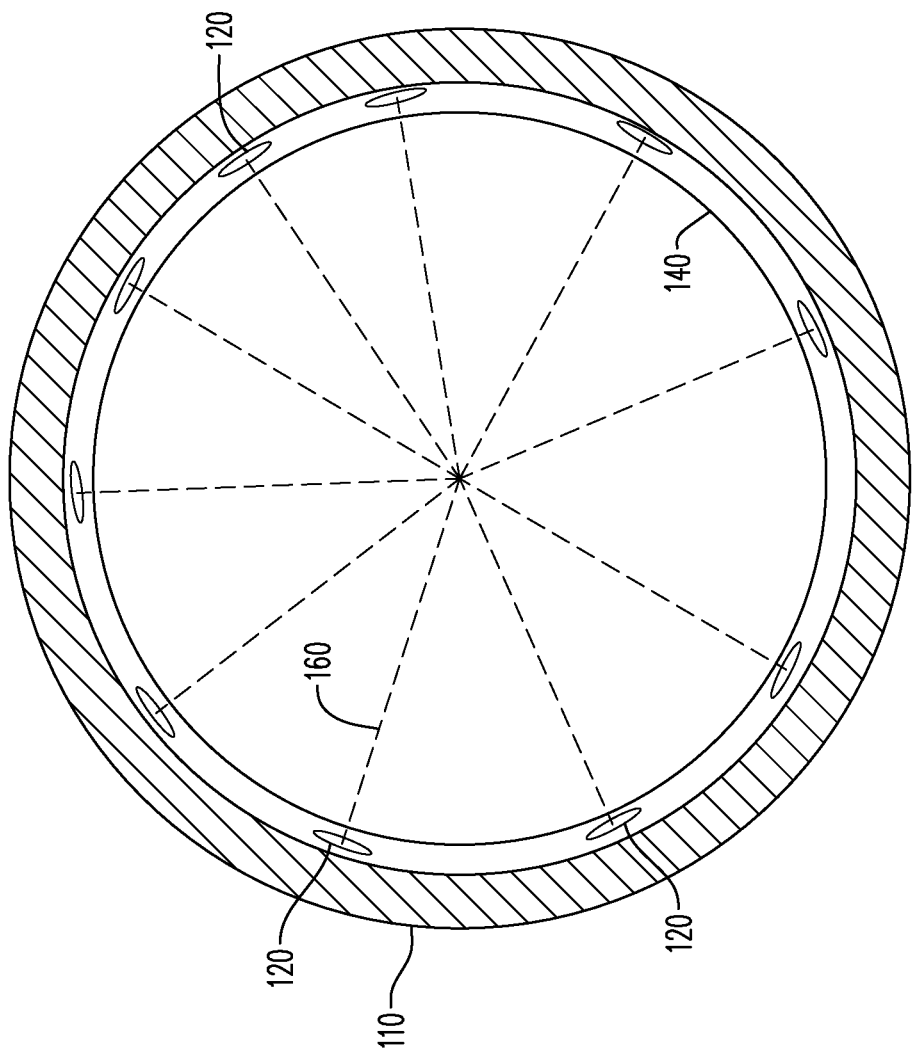
FIG. 8 illustrates a receiving zone within a wellbore in accordance with some embodiments.

FIG. 8 illustrates an example embodiment of a ring or circlet 140 configuration of one or more markers 120 is within a wellbore casing 110. As illustrated, each of the one or more markers 120 is disposed around a circumference of the wellbore casing 110 and may transmit a continuous or periodic signal 160 into the wellbore casing. In a case that each of the markers 120 transmits a periodic signal, a transmission period of the one or more markers 120 may be offset so that a continuous transmission of periodic transmissions (from the individual makers) is broadcast into the wellbore casing 110 in order for a sensor to receive the at least one periodic signal. A number of markers 120 within the wellbore casing 110 may be based on a flow rate of fluid being sent into the wellbore casing 110 which will affect a speed of the untethered drone 125.

Figure 9:
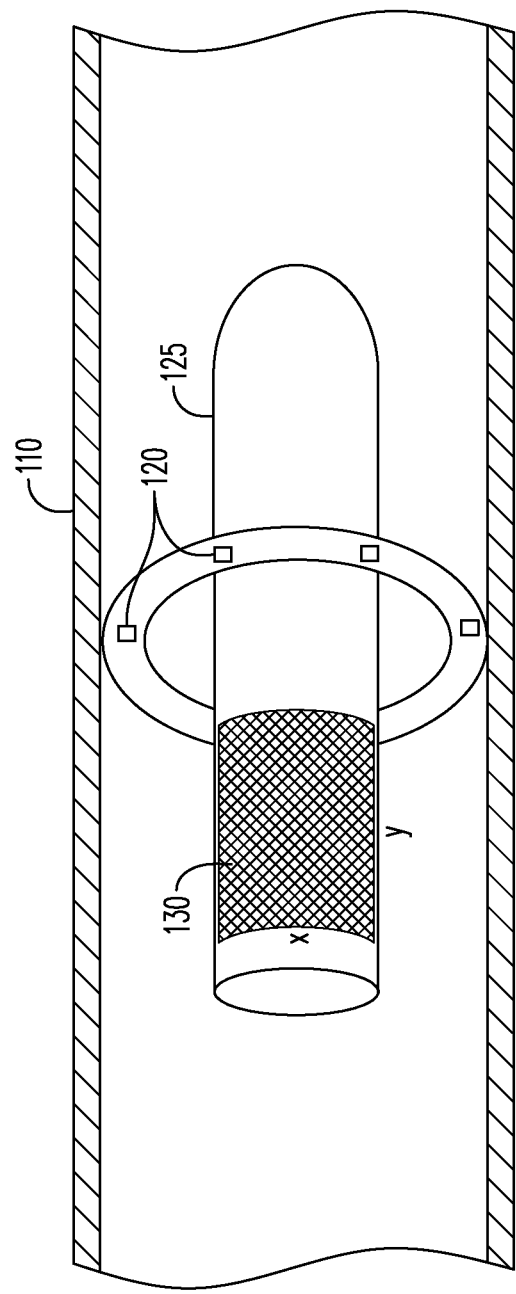
FIG. 9 illustrates an untethered drone within a receiving zone in accordance with some embodiments.

For example, and referring to FIG. 9, an untethered drone 125 may pass through a ring configuration of the one or more markers 120. The untethered drone 125 may have to be within a range or distance of the one or more markers 120 for a certain amount of time for the untethered drone 125 to sense the one or more markers 120. To aid in sensing the one or more markers, in some embodiments the untethered drone 125 may comprise a sensor 130 that includes a mesh receiving apparatus in an XY dimension to cover a portion of a surface of the untethered drone as shown. The mesh receiving apparatus may aid in extending a time that the sensor 130 is in a receiving zone defined by an output of the ring of the one or more markers 120. In some embodiments, the mesh receiving apparatus may function as an antenna and may utilize an extended surface area of the untethered drone 125 to aid in receiving the periodic or continuous signals from the one or more markers 120 when traveling at high rates of speed through the wellbore casing.

Figure 10:
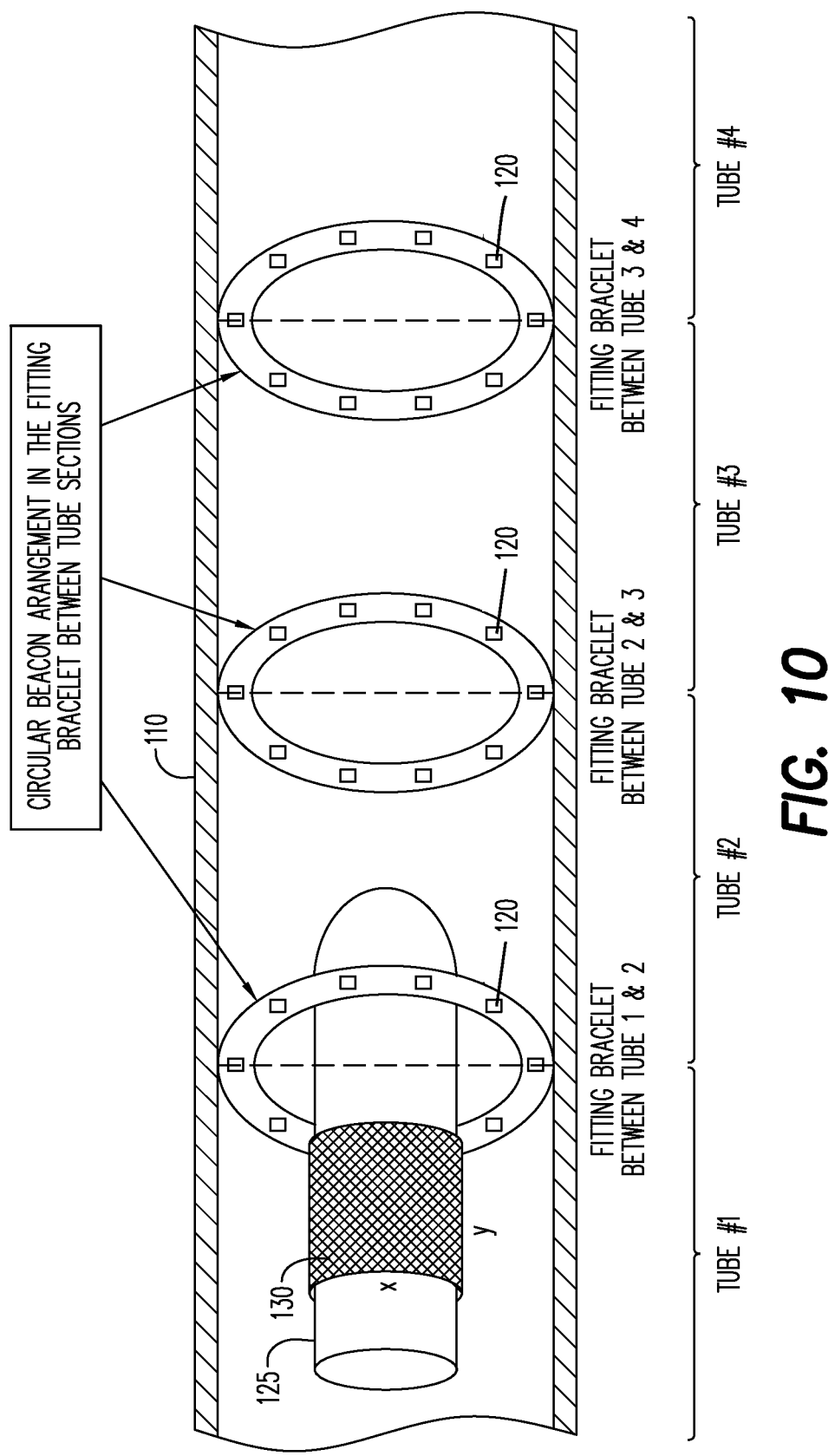
FIG. 10 illustrates a plurality of receiving zones within a wellbore in accordance with some embodiments.

As illustrated in FIG. 10, as the untethered drone 125 passes through each ring of markers 120 the untethered drone 125 may sense an existence of at least one of the one or more markers 120 in each the ring of markers. In this regard, the untethered drone 125 may determine its location based on, for example, a number of receiving zones that have been traversed or information received from the one or more markers 120 in a receiving zone 155 (not shown in FIG. 10). In a case that the one or more markers are electronic markers, the determination of a location of the untethered drone 125 may be based on a frequency that is sent by the one or more markers 120 and received by the sensor 130. For example, a first receiving zone 155 may comprise markers that transmit at 2.42 GHz and a second receiving zone may include markers that transmit at 2.46 GHz. In this regard, the sensor 130 may be able to sense a location based on a unique frequency that is received at the sensor 130. In some embodiments, determination of a location of the untethered drone 125 may be based on information that is received from the one or more markers 120 (e.g., information in a data packet such as, but not limited to, a marker identifier or receiving zone identifier).

As mentioned briefly above, a number of markers and a frequency of transmittance of information (whether in the form of emitted alpha particles, detection of a chemical, radio frequency and/or light reflectors/emitters) markers may be dependent on a speed of the untethered drone and the speed of the fluid in the wellbore casing. For a velocity of the untethered drone within one inch of a sensor the following equation may be used:

$$\bar{v}\left[\frac{\text{inch}}{\text{second}}\right] = f\left[\frac{1}{\text{second}}\right] \cdot \Delta X \text{ [inch]}$$

where $\bar{v}$ is a velocity where $\bar{v}$ is a velocity, $\Delta X$ is a range of the marker, and f i f i s a frequency of transmission from the markers.

Velocity of the untethered drone with a receiver distance of $\Delta RX$ $\Delta RX$ where $\Delta RX$ $\Delta RX$ can be any distance dependent on the length of the receiving apparatus may be defined as follows:

$$\bar{v}\left[\frac{\text{inch}}{\text{second}}\right] = f\left[\frac{1}{\text{second}}\right] \cdot \Delta RX \text{ [inch]}$$

As such, based on the speed, one can determine an amount of markers and a frequency of transmittance required for the sensor to sense a presence of the markers.

Figure 11:
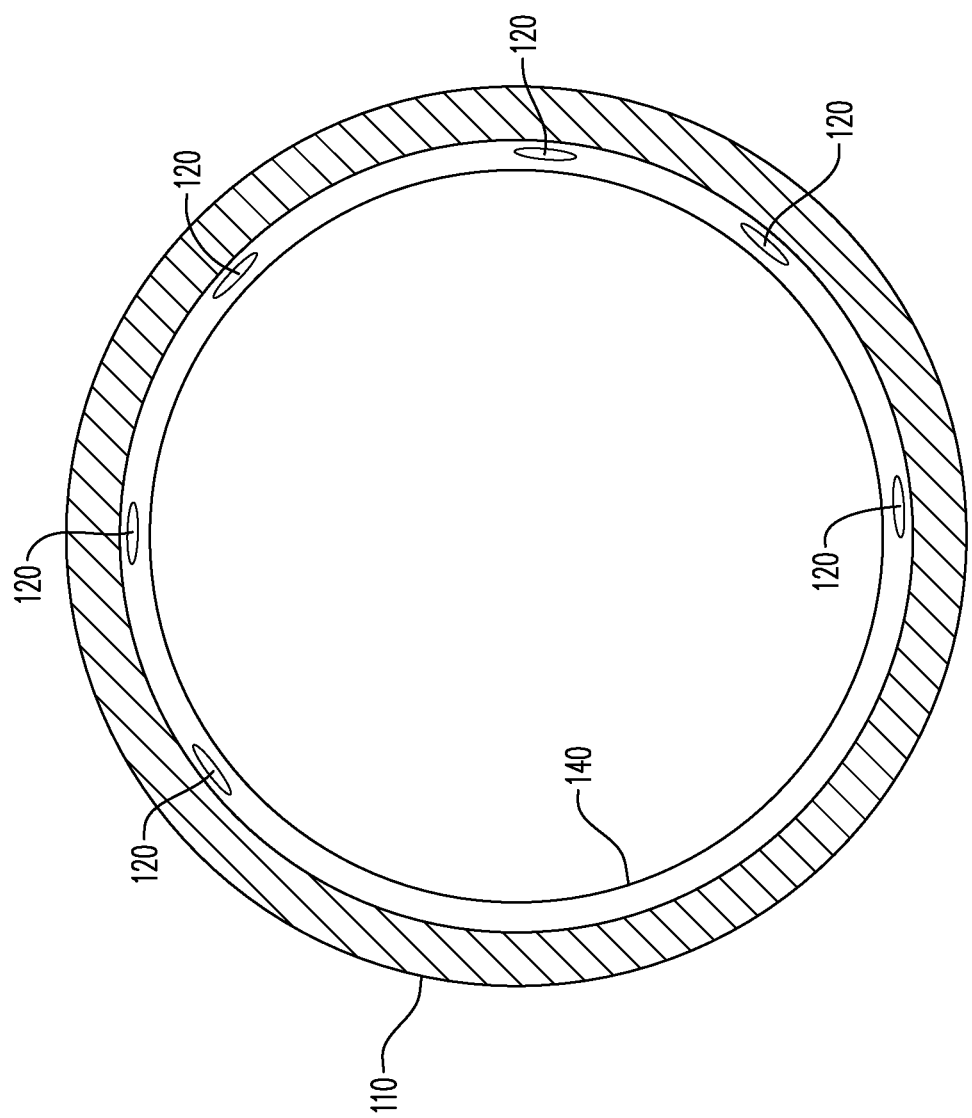
FIG. 11 illustrates a circlet within a wellbore in accordance with some embodiments.

Now referring to FIG. 11, a circlet 140 may be used for implementing the one or more markers 120. A circlet 140 may be defined as a small circular arrangement or object and the circlet 140 may be inserted inside a wellbore casing 110. The circlet 140 may be comprised of a metal, plastic, rubber, synthetic rubber or polymer that is configured for the environment (e.g., temperature, acidity, fluid flow rate, salinity, etc.) within the wellbore casing 110. The circlet 140 may be substantially flat to allow for maximum flow within the wellbore casing 110 and one or more markers 120 may be disposed within or upon the circlet 140. In some embodiments, the circlet 140 may be utilized for the placement of markers within an existing well structure as a substantially flat pass-through plug. Placement of the circlet 140 inside a wellbore casing may be accomplished using an existing wireline system such that a placement distance between each circlet 140 is known (e.g., based on a wire length).

Inserting a circlet 140 into an existing well structure may start from a toe, a furthest edge or a bottom of a wellbore which is deemed a longest location from a start (e.g., opening) of the wellbore. A placement tool may be pulled backwards up the wellbore by reducing the wire length. This may allow for proper placement of the circlet 140 while also creating a location guide to where each circlet 140 is located within the wellbore casing 110 based on wire length. Placement of the circlet 140 may typically be at a coupler 115 that joins two sections of wellbore casing 110. To place the circlet 140 into the wellbore casing 110, a slow/weak explosion may be utilized to expand the circlet 140 into its appropriate or desired location.

Figure 12:
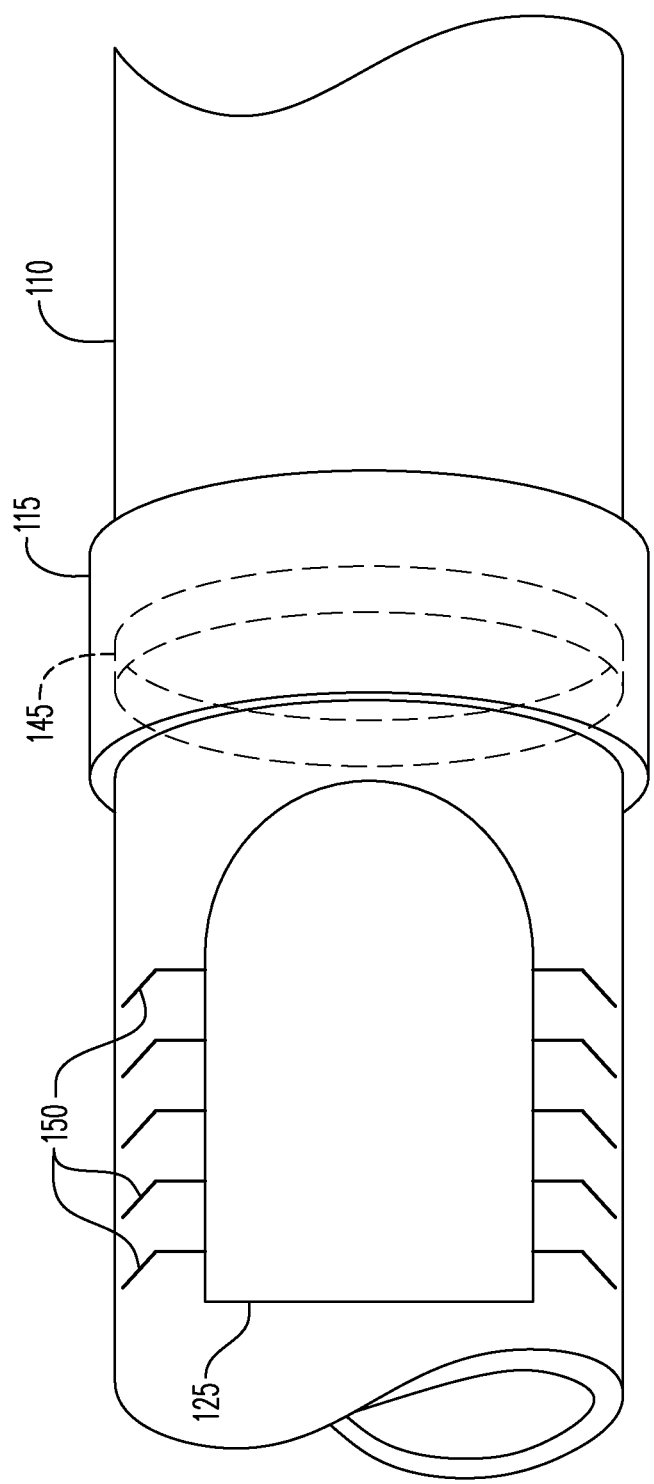
FIG. 12 illustrates an untethered drone within a wellbore in accordance with some embodiments.

Now referring to FIG. 12, a further embodiment of determining a location of an untethered drone 125 using a mechanical beacon is illustrated. The untethered drone 125 illustrated in FIG. 12 may include a plurality of fingers 150 extending from a surface of the drone 125 to feel or sense a groove 145 along an interior surface of the wellbore casing 110. The groove 145 may be between about 1 and 2 cm wide and may circumscribe an interior surface of the wellbore casing 110 or, in some embodiments, the groove 145 may be located at the coupler 115 that joins two sections of wellbore casing 110. As depicted in FIG. 12, the untethered drone 125 may travel through the wellbore casing 110 while sensing for the groove 145 until one or more fingers 150 are caught in the groove 145. When one or more fingers 150 are caught in the groove 145, the untethered drone 125 may sense this catch (and release) to determine a location of the untethered drone 125. The groove 145 and fingers 150 mechanism may function as a catch and release mechanism that results in a force (e.g., a pull) on the untethered drone 125 and this pull may be sensed by the untethered drone 125 as an indication of a location.

Figure 13:
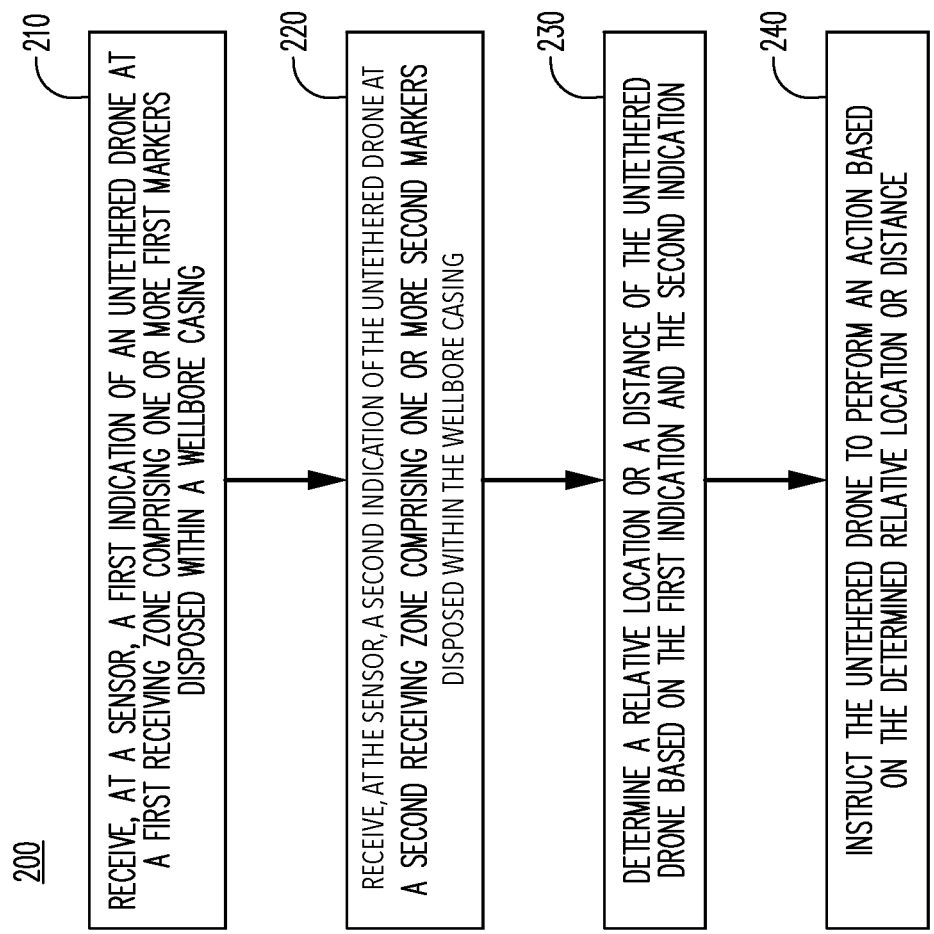
FIG. 13 illustrates a method according to some embodiments.

Now referring to FIG. 13, a method 200 that might be performed by the sensor 130, described with respect to FIG. 3, is illustrated according to some embodiments. The exemplary method described with respect to FIG. 13 does not imply a fixed order to the steps, and the same or other embodiments may be practiced in any order that is practicable. Note that any of the methods described herein may be performed by hardware, software, or any combination of these approaches. For example, a non-transitory computer-readable storage medium may store thereon instructions that when executed by a machine result in performance according to any of the embodiments described herein.

Method 200 may relate to a method for sensing a location of an untethered drone in a wellbore casing. At 210, a first indication of an untethered drone at a first receiving zone is received at a sensor. The first receiving zone may comprise one or more first markers disposed within a wellbore casing. For example, the first indication may be based on the sensor receiving a first specific frequency being received, a presence of a particular chemical or combination of chemicals, or by incrementing a counter to determine a number of receiving zones that have been traversed.

At 220, a second indication of the untethered drone at a second receiving zone may be received at the sensor. The second receiving zone may comprise one or more second markers disposed within a wellbore casing. For example, the second indication may be based on the sensor receiving a second specific frequency being received, a presence of a particular chemical or combination of chemicals, or by incrementing the counter to determine a number of receiving zones that have been traversed.

At 230, a relative location or distance of the untethered drone may be determined based on the first indication and the second indication. In some embodiments, relative locations or distances within a wellbore casing may be mapped (e.g., each location or distance within the wellbore casing may be known) and this mapping may be embedded or programed into the untethered drone and/or sensor. For example, a determination of a first location or distance in the wellbore casing may be based on determining a first frequency, a count of receiving zones, or a specific chemical combination which is known to be at the first location or distance.

At 240, the untethered drone may be instructed to perform an action based on the determined relative location or distance. The action may include, but is not limited to, a detonation of an explosive or placement of an object (e.g., a plug) within the wellbore casing. The instruction to perform an action may be input into the untethered drone prior to the untethered drone being inserted in to the wellbore, or the untethered drone may determine an instruction based on one or more signals received from the one or more first markers and the one or more second markers.

Note the embodiments described herein may be implemented using any number of different hardware configurations. For example, FIG. 14 illustrates a sensor system 300 that may be, for example, implemented in an untethered drone as described with respect to FIG. 3. The sensor system 300 may receive an indication of a presence of one or more markers in a receiving zone and initiate an action based on the presence of one or more markers.

The sensor system 300 may include the processor 310 ("processor"), such as one or more commercially available Central Processing Units (CPUs) in the form of one-chip microprocessors, coupled to a communication device 320 configured to communicate via a communication network (not shown in FIG. 14). The communication device 320 may be used to communicate, for example, with other elements of the untethered drone such as a command system to indicate to the untethered drone to perform an action. The computing system 300 further includes an input device 340 (e.g. a programming interface) for entering programming information to be used by the untethered drone.

The processor 310 also communicates with a memory/storage device 330 that stores data. The storage device 330 may include any appropriate information storage device, including combinations of magnetic storage devices (e.g., a hard disk drive), optical storage devices, and/or semiconductor memory devices. The storage device 330 may store a program and/or processing logic for controlling the processor 310. The processor 310 may perform instructions of the program and thereby operates in accordance with any of the embodiments described herein. The program may be stored in a compiled, compressed, uncompiled and/or encrypted format or a combination. The program may furthermore include other program elements, such as an operating system, a database management system, and/or device drivers used by the processor 310 to interface with peripheral devices.

As used herein, information may be "received" by or "transmitted" to, for example: (i) the sensor system 300 from another device; or (ii) a software application or module within the sensor system 300 from another software application, module, or any other source.

The present embodiments may be embodied as a system, method or computer program product. Accordingly, the present embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present embodiments may take the form of a computer program product embodied in one or more computer readable medium(s) having computer readable program code embodied thereon.

The process flow and block diagrams in the figures illustrate the architecture, functionality, and operation of possible implementations of systems, methods and computer program products according to various embodiments. In this regard, each block in the flowchart or block diagrams may represent a module, segment, or portion of code, which includes one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that any of the methods described herein can include an additional step of providing a system comprising distinct software modules embodied on a computer readable storage medium; the modules can include, for example, any or all of the elements depicted in the block diagrams and/or described herein; by way of example and not limitation, a geometrical compensation module. The method steps can then be carried out using the distinct software modules and/or sub-modules of the system, as described above, executing on one or more hardware processors. Further, a computer program product can include a computer-readable storage medium with code adapted to be implemented to carry out one or more method steps described herein, including the provision of the system with the distinct software modules.

Various adaptations and modifications of the above-described embodiments can be configured without departing from the scope and spirit of the claims. Therefore, it is to be understood that the claims may be practiced other than as specifically described herein.

The present disclosure, in various embodiments, configurations and aspects, includes components, methods, processes, systems and/or apparatus substantially developed as depicted and described herein, including various embodiments, sub-combinations, and subsets thereof. Those of skill in the art will understand how to make and use the present disclosure after understanding the present disclosure. The present disclosure, in various embodiments, configurations and aspects, includes providing devices and processes in the absence of items not depicted and/or described herein or in various embodiments, configurations, or aspects hereof, including in the absence of such items as may have been used in previous devices or processes, e.g., for improving performance, achieving ease and/or reducing cost of implementation.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

In this specification and the claims that follow, reference will be made to a number of terms that have the following meanings. The terms "a" (or "an") and "the" refer to one or more of that entity, thereby including plural referents unless the context clearly dictates otherwise. As such, the terms "a" (or "an"), "one or more" and "at least one" can be used interchangeably herein. Furthermore, references to "one embodiment", "some embodiments", "an embodiment" and the like are not intended to be interpreted as excluding the existence of additional embodiments that also incorporate the recited features. Approximating language, as used herein throughout the specification and claims, may be applied to modify any quantitative representation that could permissibly vary without resulting in a change in the basic function to which it is related. Accordingly, a value modified by a term such as "about" is not to be limited to the precise value specified. In some instances, the approximating language may correspond to the precision of an instrument for measuring the value. Terms such as "first," "second," "upper," "lower" etc. are used to identify one element from another, and unless otherwise specified are not meant to refer to a particular order or number of elements.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances the modified term may sometimes not be appropriate, capable, or suitable. For example, in some circumstances an event or capacity can be expected, while in other circumstances the event or capacity cannot occur—this distinction is captured by the terms "may" and "may be."

As used in the claims, the word "comprises" and its grammatical variants logically also subtend and include phrases of varying and differing extent such as for example, but not limited thereto, "consisting essentially of" and "consisting of." Where necessary, ranges have been supplied, and those ranges are inclusive of all sub-ranges therebetween. It is to be expected that variations in these ranges will suggest themselves to a practitioner having ordinary skill in the art and, where not already dedicated to the public, the appended claims should cover those variations.

The terms "determine", "calculate" and "compute," and variations thereof, as used herein, are used interchangeably and include any type of methodology, process, mathematical operation or technique.

The foregoing discussion of the present disclosure has been presented for purposes of illustration and description. The foregoing is not intended to limit the present disclosure to the form or forms disclosed herein. In the foregoing Detailed Description for example, various features of the present disclosure are grouped together in one or more embodiments, configurations, or aspects for the purpose of streamlining the disclosure. The features of the embodiments, configurations, or aspects of the present disclosure may be combined in alternate embodiments, configurations, or aspects other than those discussed above. This method of disclosure is not to be interpreted as reflecting an intention that the present disclosure requires more features than are expressly recited in each claim. Rather, as the following claims reflect, the claimed features lie in less than all features of a single foregoing disclosed embodiment, configuration, or aspect. Thus, the following claims are hereby incorporated into this Detailed Description, with each claim standing on its own as a separate embodiment of the present disclosure.

Advances in science and technology may make equivalents and substitutions possible that are not now contemplated by reason of the imprecision of language; these variations should be covered by the appended claims. This written description uses examples to disclose the method, machine and computer-readable medium, including the best mode, and also to enable any person of ordinary skill in the art to practice these, including making and using any devices or systems and performing any incorporated methods. The patentable scope thereof is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal language of the claims.

What is claimed is:

1. A system for determining a location of an untethered drone in a wellbore, the system comprising:

a first circlet including a plurality of markers disposed around a circumference of a wellbore casing, the plurality of markers including a first marker configured to transmit a first periodic signal during a first time period, and a second marker configured to transmit a second periodic signal during a second time period, the first time period and the second time period being different time periods; and a first sensor connected to the untethered drone, wherein the first sensor is configured for sensing at least one of the first periodic signal or the second periodic signal.

2. The system of claim 1, wherein the first sensor is configured for receiving information from the plurality of markers when the first sensor senses the plurality of markers.

3. The system of claim 1, wherein the plurality of markers of the first circlet are disposed in a first receiving zone that is defined based on an output of the plurality of markers.

4. The system of claim 1, wherein the plurality of markers are electronic markers.

5. The system of claim 4, wherein the plurality of markers further include a third marker configured to transmit a third periodic signal during a third time period, wherein the first time period, the second time period and the third time period are different time periods.

6. The system of claim 5, wherein the first time period, the second time period, and the third time period are preset by a user.

7. The system of claim 1, wherein the wellbore casing includes a plurality of pipes joined together via a plurality of couplers and wherein the plurality of markers of the first circlet are disposed within one of the plurality of couplers.

8. The system of claim 1, wherein the first circlet includes a body formed from a material comprising at least one of a plastic, polymer, rubber or synthetic rubber.

9. A system for determining a location of an untethered drone in a wellbore, the system comprising:

a plurality of receiving zones defined by a plurality of respective circlets positioned within a wellbore casing in an axially spaced relation to one another, the plurality of circlets including a first circlet having a plurality of markers disposed around a circumference of the wellbore casing, the plurality of markers including a first marker configured to transmit a first periodic signal during a first time period, and a second marker configured to transmit a second periodic signal during a second time period, the first time period and the second time period being different time periods; and a marker receiver configured to be transported into the wellbore casing by the untethered drone, wherein the marker receiver is configured for receiving at least one of the first periodic signal or the second period signal, wherein a first receiving zone of the plurality of receiving zones does not overlap a second receiving zone of the plurality of receiving zones or the marker receiver is configured to distinguish between the first receiving zone and the second receiving zone.

10. The system of claim 9, wherein the second receiving zone is defined based on an output of a plurality of markers of a second circlet of the plurality of circlets, the first and second circlets being axially spaced from one another along the wellbore casing.

11. The system of claim 9, wherein the plurality of markers of the first circlet includes a third marker configured to transmit a third periodic signal during a third time period, wherein the first time period, the second time period and the third time period are different time periods.

12. The system of claim 9, wherein the marker receiver includes a mesh signal receiver extending along a length of a surface of the untethered drone.

13. A method for determining a location of an untethered drone in a wellbore, the method comprising:
   receiving, at a sensor connected to an untethered drone, a first indication of the untethered drone at a first receiving zone within a wellbore casing, wherein the first receiving zone is defined by a plurality of first markers of a first circlet that is positioned within the wellbore casing, the plurality of first markers including a first marker configured to transmit a first periodic signal during a first time period, and a second marker configured to transmit a second periodic signal during a second time period, the first time period and the second time period being different time periods, wherein the first indication is the first periodic signal or the second periodic signal;
   receiving, at the sensor, a second indication of the untethered drone at a second receiving zone within the wellbore casing, wherein the second receiving zone is defined by a plurality of second markers of a second circlet that is positioned within the wellbore casing; and
   determining, via a processor, a relative location or distance of the untethered drone within the wellbore casing based on the first indication and the second indication.

14. The method of claim 13, further comprising the step of:
   initiating an action of the untethered drone based on the determined relative location or distance of the untethered drone.

15. The method of claim 14, wherein the action comprises a detonation of an explosive or placement of an object within the wellbore casing.

16. The method of claim 13, further comprising programming the untethered drone, prior to deploying the untethered drone in the wellbore casing, to initiate an action of the untethered drone based on the determined relative location or distance of the untethered drone.

* * * * *